(12) United States Patent
Smith et al.

(10) Patent No.: US 10,014,006 B1
(45) Date of Patent: Jul. 3, 2018

(54) METHOD OF DETERMINING WHETHER A PHONE CALL IS ANSWERED BY A HUMAN OR BY AN AUTOMATED DEVICE

(71) Applicant: Ampersand, Inc., Carlisle, MA (US)

(72) Inventors: Stephen Smith, Carlisle, MA (US); George Howitt, Toronto (CA); Douglas Campbell, Nashua, NH (US)

(73) Assignee: Ampersand, Inc., Carlisle, MA (US)

( * ) Notice: Subject to any disclaimer, the term of this patent is extended or adjusted under 35 U.S.C. 154(b) by 0 days.

(21) Appl. No.: 15/589,622

(22) Filed: May 8, 2017

Related U.S. Application Data

(63) Continuation-in-part of application No. 14/677,970, filed on Apr. 2, 2015, now Pat. No. 9,679,584, which
(Continued)

(51) Int. Cl.
| | |
|---|---|
| *G10L 25/78* | (2013.01) |
| *G10L 25/51* | (2013.01) |
| *G10L 25/90* | (2013.01) |
| *G10L 25/18* | (2013.01) |
| *H04M 3/523* | (2006.01) |
| *H04M 3/493* | (2006.01) |

(52) U.S. Cl.
CPC .............. *G10L 25/78* (2013.01); *G10L 25/18* (2013.01); *G10L 25/51* (2013.01); *G10L 25/90* (2013.01); *H04M 3/493* (2013.01); *H04M 3/523* (2013.01); *H04M 2203/2027* (2013.01); *H04M 2203/306* (2013.01)

(58) Field of Classification Search
CPC ............... H04M 3/5158; H04M 3/533; H04M 2203/2027; H04M 3/523; H04M 2203/306; H04M 3/493; G10L 25/78; G10L 25/51; G10L 25/90; G10L 25/18
See application file for complete search history.

(56) References Cited

U.S. PATENT DOCUMENTS

| | | |
|---|---|---|
| 4,677,466 A | 6/1987 | Lert et al. |
| 5,918,223 A | 6/1999 | Blum et al. |
| | (Continued) | |

OTHER PUBLICATIONS

Nguyen, M. et al.; "Efficient Advertisement Discovery for Audio Podcast Content Using Candidate Segmentation"; EURASIP Journal on Audio Speech, and Music Processing; Jun. 2010; all pages; vol. 2010; Hindawi Publishing Corporation.

*Primary Examiner* — Lisa Hashem
(74) *Attorney, Agent, or Firm* — North Shore Patents, P.C.; Michele Liu Baillie

(57) ABSTRACT

A system receives an audio stream from an application, and performs signal analysis on the audio stream to compute (on sound and silence) a sequence of events. The sequence of events identifies a pattern comprised of at least two of sound, silence, frequency, magnitude, duration, tone, and Dual Tone Multi Frequency (DTMF). The pattern matches a similar pattern of at least two of sound, silence, frequency, magnitude, duration, tone, and DTMF, and the signal analysis is performed on sound and silence within the audio stream. The similar pattern is associated with at least one of an automated device or human answering the call. The system determines whether the sequence of events indicates the phone call is answered by the automated device or the human, based on rules in a heuristic engine and/or a known audio print from a library of known audio prints.

24 Claims, 17 Drawing Sheets

Related U.S. Application Data is a continuation of application No. 14/023,424, filed on Sep. 10, 2013, now Pat. No. 9,053,711.

(56) References Cited

U.S. PATENT DOCUMENTS

| | | | |
|---|---|---|---|
| 6,219,639 | B1 | 4/2001 | Bakis et al. |
| 6,469,749 | B1 | 10/2002 | Dimitrova et al. |
| 6,549,587 | B1* | 4/2003 | Li .................. H04B 3/23 |
| | | | 375/324 |
| 6,990,453 | B2 | 1/2006 | Wang et al. |
| 7,330,538 | B2 | 2/2008 | Dunsmuir |
| 7,346,512 | B2 | 3/2008 | Wang et al. |
| 7,359,889 | B2 | 4/2008 | Wang et al. |
| 7,366,461 | B1 | 4/2008 | Brown |
| 7,379,875 | B2 | 5/2008 | Burges et al. |
| 7,451,078 | B2 | 11/2008 | Bogdanov |
| 7,627,477 | B2 | 12/2009 | Wang et al. |
| 7,739,062 | B2 | 6/2010 | Wang et al. |
| 7,769,189 | B1 | 8/2010 | Moulios et al. |
| 7,853,664 | B1 | 12/2010 | Wang et al. |
| 7,865,368 | B2 | 1/2011 | Wang et al. |
| 7,881,657 | B2 | 2/2011 | Wang et al. |
| 7,986,913 | B2 | 7/2011 | Wang et al. |
| 8,015,123 | B2 | 9/2011 | Barton et al. |
| 8,086,171 | B2 | 12/2011 | Wang et al. |
| 8,090,579 | B2 | 1/2012 | Debusk et al. |
| 8,109,435 | B2 | 2/2012 | Mayo et al. |
| 8,352,259 | B2 | 1/2013 | Bogdanov |
| 9,787,839 | B1* | 10/2017 | Noble, Jr. ........ H04M 3/5175 |
| 2002/0001369 | A1* | 1/2002 | Merwin ......... H04M 1/274575 |
| | | | 379/67.1 |
| 2003/0088403 | A1* | 5/2003 | Chan .................. G10L 15/26 |
| | | | 704/213 |
| 2004/0170258 | A1* | 9/2004 | Levin ............ H04M 1/274575 |
| | | | 379/88.01 |
| 2005/0002515 | A1* | 1/2005 | Mewhinney ...... H04M 3/5158 |
| | | | 379/266.08 |
| 2006/0248019 | A1 | 11/2006 | Rajakumar |
| 2008/0154609 | A1 | 6/2008 | Wasserblat et al. |
| 2009/0128861 | A1* | 5/2009 | Toscano ............... H04M 3/53 |
| | | | 358/400 |
| 2009/0220056 | A1* | 9/2009 | Simpson ............. G10L 15/005 |
| | | | 379/88.03 |
| 2010/0040342 | A1 | 2/2010 | Kemp et al. |
| 2010/0104112 | A1 | 4/2010 | Almquist et al. |
| 2010/0145688 | A1 | 6/2010 | Sung et al. |
| 2011/0288866 | A1 | 11/2011 | Rasmussen |
| 2012/0127986 | A1* | 5/2012 | Verbil ................ H04M 1/2535 |
| | | | 370/352 |
| 2012/0331386 | A1 | 12/2012 | Hicken et al. |
| 2013/0111514 | A1 | 5/2013 | Slavin et al. |
| 2014/0136194 | A1 | 5/2014 | Warlord et al. |
| 2014/0330563 | A1 | 11/2014 | Faians et al. |
| 2015/0039302 | A1 | 2/2015 | Jarvinen et al. |
| 2015/0269946 | A1 | 9/2015 | Jones |
| 2015/0350438 | A1 | 12/2015 | Arslan et al. |
| 2016/0036962 | A1 | 2/2016 | Rand |
| 2016/0132593 | A1 | 5/2016 | Favale et al. |
| 2016/0182727 | A1 | 6/2016 | Baran et al. |
| 2016/0307572 | A1 | 10/2016 | Rodriguez |
| 2017/0163804 | A1* | 6/2017 | Bouzid ............... H04M 3/5158 |
| 2017/0230504 | A1* | 8/2017 | Singer ............... H04M 3/5158 |
| 2017/0332153 | A1* | 11/2017 | Shilling ............... H04Q 1/46 |

* cited by examiner

204 IF APPLICATION OF THE SILENCE CONSTRAINT IS SUCCESSFUL, COMPUTE A TOTAL SCORING METRIC FUNCTION ASSOCIATED WITH THE POTENTIAL MATCH TO IDENTIFY A MATCH BETWEEN THE STREAM AUDIO PRINT AND THE KNOWN AUDIO PRINT

205 OVERLAY THE STREAM AUDIO PRINT WITH THE KNOWN AUDIO PRINT

206 COMPUTE A SCORING METRIC FUNCTION AT A SUBSET OF TEMPORAL POINTS

207 SUM A RESULT OF THE SCORING METRIC FUNCTION AT EACH OF THE SUBSET OF TEMPORAL POINTS TO CREATE A TOTAL SCORE METRIC, WHEREIN THE TOTAL SCORE METRIC IS A RESULT OF THE TOTAL SCORING METRIC FUNCTION

FIG. 4

221 IF APPLICATION OF THE SILENCE CONSTRAINT IS SUCCESSFUL, COMPUTE A TOTAL SCORING METRIC FUNCTION ASSOCIATED WITH THE POTENTIAL MATCH TO IDENTIFY A MATCH BETWEEN THE STREAM AUDIO PRINT AND THE KNOWN AUDIO PRINT

222 PERFORM THE SIGNAL ANALYSIS, APPLYING THE SILENCE CONSTRAINT, DETERMINING THE POTENTIAL MATCH, AND COMPUTING THE TOTAL SCORING METRIC FUNCTION, REAL TIME, ON THE AUDIO STREAM AS THE AUDIO STREAM IS RECEIVED

OR

223 GENERATE AN EVENT AS A RESULT OF IDENTIFYING THE MATCH BY NOTIFYING THE APPLICATION OF IDENTIFICATION OF THE MATCH

OR

224 IF APPLICATION OF THE SILENCE CONSTRAINT IS NOT SUCCESSFUL, CONTINUE TO PERFORM THE SIGNAL ANALYSIS, APPLY THE SILENCE CONSTRAINT, DETERMINE THE POTENTIAL MATCH, AND COMPUTE THE TOTAL SCORING METRIC FUNCTION ON A PLURALITY OF SEGMENTS ASSOCIATED WITH THE AUDIO STREAM, WHEREIN THE AUDIO STREAM IS COMPRISED OF THE PLURALITY OF SEGMENTS, UNTIL AT LEAST ONE OF:
    I) THE POTENTIAL MATCH IS DETERMINED
    II) THE POTENTIAL MATCH IS NOT DETERMINED IN ANY OF THE PLURALITY OF SEGMENTS, AND NOTIFYING THE APPLICATION THAT THERE IS NO MATCHING KNOWN AUDIO PRINT, FOR THE KNOWN AUDIO PRINT, OR ANY OF THE KNOWN AUDIO PRINTS IN THE LIBRARY OF KNOWN AUDIO PRINTS.

OR

225 IF APPLICATION OF THE SILENCE CONSTRAINT IS NOT SUCCESSFUL, IDENTIFY THE STREAM AUDIO PRINT AS A POSSIBLE NEW KNOWN AUDIO PRINT TO BE ADDED TO THE LIBRARY OF KNOWN AUDIO PRINTS

FIG. 7

226 CONSTRUCT, AT THE PROCESSOR, THE LIBRARY OF KNOWN AUDIO PRINTS FROM PRE-RECORDED AUDIO STREAM SEGMENTS PROVIDED BY THE APPLICATION, WHEREIN THE LIBRARY OF KNOWN AUDIO PRINTS COMPRISES KNOWN AUDIO PRINTS AND SYNTHETIC AUDIO PRINTS, AND WHEREIN THE KNOWN AUDIO PRINT IS CREATED BY:
DETERMINING PERIODS OF SILENCE IN THE PRE-RECORDED AUDIO STREAM SEGMENTS WHERE ENERGY IS LESS THAN A TUNABLE THRESHOLD, TO CREATE A SILENCE CONSTRAINT ASSOCIATED WITH THE KNOWN AUDIO PRINT;
SELECTING TEMPORAL POINTS WITHIN THE KNOWN AUDIO PRINT; AND DETERMINING COMPONENT DATA AT THE TEMPORAL POINTS; AND
GENERATE A SYNTHETIC AUDIO PRINT FROM A PLURALITY OF SIMILAR AUDIO STREAMS FROM THE PRE-RECORDED AUDIO STREAM SEGMENTS PROVIDED BY THE APPLICATION

227 GENERATE A SYNTHETIC AUDIO PRINT FROM A PLURALITY OF SIMILAR AUDIO STREAMS THAT THE APPLICATION DESIRES TO DETECT, WHEREIN THE LIBRARY OF KNOWN AUDIO PRINTS COMPRISES AUDIO PRINTS AND SYNTHETIC AUDIO PRINTS

228 PERFORM THE SIGNAL ANALYSIS ON A PLURALITY OF SIMILAR AUDIO STREAMS TO GENERATE A PLURALITY OF STREAM AUDIO PRINTS

229 PERFORM A STATISTICAL COMPARISON ON THE PLURALITY OF STREAM AUDIO PRINTS TO DETERMINE:
  I) COMMON PERIODS OF SILENCE
  II) COMMON FREQUENCIES AMONG THE PLURALITY OF STREAM AUDIO PRINTS
  III) FREQUENCIES WITHIN THE PLURALITY OF STREAM AUDIO PRINTS THAT MOST OFTEN MATCH AT LEAST ONE FREQUENCY ASSOCIATED WITH THE AT LEAST ONE KNOWN AUDIO PRINT

230 GENERATE THE SYNTHETIC AUDIO PRINT FROM:
  I) THE COMMON PERIODS OF SILENCE
  II) THE COMMON FREQUENCIES AMONG THE PLURALITY OF STREAM AUDIO PRINTS
  III) THE FREQUENCIES WITHIN THE PLURALITY OF STREAM AUDIO PRINTS THAT MOST OFTEN MATCH THE AT LEAST ONE FREQUENCY ASSOCIATED WITH THE AT LEAST ONE KNOWN AUDIO PRINT

231 USE THE SYNTHETIC AUDIO PRINT AS THE KNOWN AUDIO PRINT WHEN:
I) DETERMINING THE POTENTIAL MATCH
II) COMPUTING THE TOTAL SCORING METRIC FUNCTION

FIG. 8

232 PERFORM SIGNAL ANALYSIS ON THE AUDIO STREAM TO COMPUTE A STREAM AUDIO PRINT OF THE AUDIO STREAM, WHEREIN THE STREAM AUDIO PRINT IDENTIFIES A PATTERN ASSOCIATED WITH THE AUDIO STREAM, AND WHEREIN THE SIGNAL ANALYSIS IS PERFORMED ON SOUND AND SILENCE WITHIN THE AUDIO STREAM

233 DETERMINE AT LEAST TWO FREQUENCIES WITHIN THE AUDIO STREAM WHEREIN THE AT LEAST TWO FREQUENCIES ARE SELECTED FROM A PLURALITY OF COMPUTED FREQUENCIES

↓

234 DETERMINE A RESPECTIVE AMPLITUDE ASSOCIATED WITH EACH OF THE AT LEAST TWO FREQUENCIES

↓

235 IDENTIFY AN AMPLITUDE RATIO BETWEEN EACH OF THE RESPECTIVE AMPLITUDES

OR

236 IDENTIFY AT LEAST ONE PERIOD OF SILENCE WITHIN THE AUDIO STREAM WHEREIN THE AT LEAST ONE PERIOD OF SILENCE IS IDENTIFIED WHEN ENERGY IS LOWER THAN A PERCENTAGE OF A PEAK AMPLITUDE ASSOCIATED WITH A RESPECTIVE SAMPLE OF THE AUDIO STREAM, WHEREIN THE PERCENTAGE IS TUNABLE

FIG. 9

237 APPLY A SILENCE CONSTRAINT TO MATCH PERIODS OF SILENCE IN THE STREAM AUDIO PRINT TO PERIODS OF SILENCE IN A KNOWN AUDIO PRINT FROM A LIBRARY OF KNOWN AUDIO PRINTS, WHEREIN THE SILENCE CONSTRAINT IS ASSOCIATED WITH THE KNOWN AUDIO PRINT

238 TEMPORALLY MATCH AT LEAST ONE SILENCE PERIOD BETWEEN THE STREAM AUDIO PRINT AND THE KNOWN AUDIO PRINT

FIG. 10

239 DETERMINE A POTENTIAL MATCH BETWEEN THE STREAM AUDIO PRINT AND THE KNOWN AUDIO PRINT

240 DETERMINE THE POTENTIAL MATCH BETWEEN:
I) AT LEAST TWO FREQUENCIES AND AMPLITUDE RATIOS ASSOCIATED WITH THE STREAM AUDIO PRINT
II) AT LEAST TWO FREQUENCIES AND AMPLITUDE RATIOS ASSOCIATED WITH THE KNOWN AUDIO PRINT+

FIG. 11

241 RECEIVE, AT THE PROCESSOR, AN AUDIO STREAM FROM AN APPLICATION

242 RECEIVE THE AUDIO STREAM OF AN OUTBOUND TELEPHONE CALL BEFORE THE TELEPHONE CALL IS ANSWERED, WHEREIN THE AUDIO STREAM IS COMPRISED OF AT LEAST ONE OF:
- I) EARLY MEDIA;
- II) PRE-CALL AUDIO OF THE TELEPHONE CALL; AND
- III) RING BACK AUDIO;

WHEREIN THE KNOWN AUDIO PRINT FROM THE LIBRARY OF KNOWN AUDIO PRINTS COMPRISES A LIBRARY OF PRE-RECORDED MESSAGES REPRESENTING MESSAGES PLAYED BY AT LEAST ONE OF:
- I) A TELECOMMUNICATION CARRIER;
- II) A PHONE COMPANY;
- III) A MOBILE PHONE COMPANY; AND
- IV) A RING BACK TONE PROVIDER;

AND WHEREIN THE PRE-RECORDED MESSAGES COMPRISE AT LEAST ONE OF:
- I) VOICE AUDIO;
- II) A PERIOD OF SILENCE;
- III) A SPECIAL INFORMATION TONE; AND
- IV) A RING TONE.

FIG. 12

243 RECEIVE, AT THE PROCESSOR, AN AUDIO STREAM FROM AN APPLICATION

244 RECEIVE THE AUDIO STREAM OF AN OUTBOUND TELEPHONE CALL IMMEDIATELY AFTER THE TELEPHONE CALL IS ANSWERED;
    WHEREIN THE KNOWN AUDIO PRINT FROM THE LIBRARY OF KNOWN AUDIO PRINTS COMPRISES A LIBRARY OF PRE-RECORDED MESSAGES REPRESENTING MESSAGES PLAYED BY AT LEAST ONE OF:
        I) AN ANSWERING MACHINE; AND
        II) A VOICEMAIL SYSTEM;
    AND WHEREIN THE PRE-RECORDED MESSAGES COMPRISE AT LEAST ONE OF:
        I) A DEFAULT MESSAGE PLAYED BY THE ANSWERING MACHINE IF A PERSON RECEIVING THE TELEPHONE CALL HAS NOT RECORDED THEIR OWN GREETING;
        II) THE VOICEMAIL SYSTEM USED BY A PBX SYSTEM;
        III) THE VOICEMAIL SYSTEM USED BY AN ACD SYSTEM;
        IV) THE VOICEMAIL SYSTEM USED BY A MOBILE CARRIER;
        THE VOICEMAIL SYSTEM USED BY A TELEPHONE COMPANY;
        V) ANOTHER TYPE OF AUTOMATED ANSWERING MESSAGE PLAYED WHEN THE PERSON RECEIVING THE TELEPHONE CALL DOES NOT ANSWER IN PERSON; AND
        VI) A BEEP OR TONE PLAYED BY THE ANSWERING MACHINE OR THE VOICEMAIL SYSTEM INDICATING THAT A CALLER IS TO RECORD A MESSAGE.

245 RECEIVE, AT THE PROCESSOR, AN AUDIO STREAM FROM AN APPLICATION

246 RECEIVE THE AUDIO STREAM OF AN OUTBOUND TELEPHONE CALL AFTER THE TELEPHONE CALL IS ANSWERED;
    WHEREIN THE KNOWN AUDIO PRINT FROM THE LIBRARY OF KNOWN AUDIO PRINTS COMPRISES A LIBRARY OF PRE-RECORDED MESSAGES REPRESENTING MESSAGES PLAYED BY AN INTERACTIVE VOICE RESPONSE (IVR) SYSTEM;
    AND WHEREIN THE PRE-RECORDED MESSAGES COMPRISE AT LEAST ONE OF:
        I) VOICE PROMPTS PLAYED BY THE IVR; AND
        II) TONES PLAYED BY THE IVR

METHOD OF DETERMINING WHETHER A PHONE CALL IS ANSWERED BY A HUMAN OR BY AN AUTOMATED DEVICE

CROSS-REFERENCE TO RELATED APPLICATIONS

The present application is a continuation-in-part application of co-pending U.S. patent application Ser. No. 14/677,970, filed on Apr. 2, 2015.

BACKGROUND

There are various applications that process audio data. Telephony systems can analyze audio of outbound phone calls to determine if the call is answered by a human or an automated device such as an answering machine, a voicemail system, or an Interactive Voice Response (IVR) system. These various applications process audio data, and report the results of the processing.

SUMMARY

According to one embodiment disclosed herein, in a method for matching a digitized stream of audio signals to a known audio recording, a processor receives an audio stream from an application. The method, via the processor, performs signal analysis on the audio stream to compute a stream audio print of the audio stream, where the stream audio print identifies a pattern associated with the audio stream. The signal analysis is performed on sound and silence within the audio stream. The method, via the processor, applies a silence constraint to match periods of silence in the stream audio print to periods of silence in a known audio print from a library of known audio prints. The silence constraint is associated with the known audio print. The method, via the processor, determines a potential match between the stream audio print and the known audio print. If application of the silence constraint is successful, the method, via the processor, computes a total scoring metric function associated with the potential match to identify a match between the stream audio print and the known audio print.

In one aspect of embodiments disclosed herein, when the method computes the total scoring metric function, the method overlays the stream audio print with the known audio print. The method computes a scoring metric function at a subset of temporal points, and sums a result of the scoring metric function at each of the subset of temporal points to create a total score metric. The total score metric is a result of the total scoring metric function.

In one aspect of embodiments disclosed herein, when the method computes the total scoring metric function, the method computes the scoring metric function at a temporal point between component data from the stream audio print, and component data from the known audio print. The component data from the stream audio print comprises a first frequency associated with the stream audio print, a second frequency associated with the stream audio print, and a first amplitude ratio associated with the first frequency and the second frequency. The component data from the known audio print comprises a third frequency associated with the known audio print, a fourth frequency associated with the known audio print, and a second amplitude ratio associated with the third frequency and the fourth frequency.

In one aspect of embodiments disclosed herein, the method then calculates a first component as a difference between the first frequency and the third frequency, and applies a first tunable parameter to scale the first component. The method calculates a second component as a difference between the second frequency and the fourth frequency, and applies a second tunable parameter to scale the second component. The method calculates a third component as a difference between the first amplitude ratio and the second amplitude ratio, and applies a third tunable parameter to scale the third component. The method then sums the first component, the second component, and the third component to calculate the scoring function. Each of the first, second and third tunable parameters is chosen to scale an influence that the respective first, second, and third component has on the result of the scoring metric function.

In one aspect of embodiments disclosed herein, the method determines the match between the stream audio print and the known audio print when the total scoring metric is a low value, where the low value is less than a tunable threshold.

In one aspect of embodiments disclosed herein, when the method computes the total scoring metric function, the method chooses the subset of temporal points as temporal points that are not periods of silence. Alternatively, the method chooses the subset of temporal points as temporal points that have the greatest frequency amplitude. The number of temporal points in the subset is tunable.

In one aspect of embodiments disclosed herein, the method performs the signal analysis, applies the silence constraint, determines the potential match, and computes the total scoring metric function, real time, on the audio stream as the audio stream is received.

In one aspect of embodiments disclosed herein, if the application of the silence constraint is not successful, the method continues to perform the signal analysis, apply the silence constraint, determine the potential match, and compute the total scoring metric function on a plurality of segments associated with the audio stream until the potential match is, or is not determined in any of the plurality of segments. The audio stream is comprised of the plurality of segments. If the potential match is not determined in any of the plurality of segments, for any of one or more known audio prints in the library of known audio prints, the method notifies the application that there is no matching known audio print.

In one aspect of embodiments disclosed herein, if application of the silence constraint is not successful, the method identifies the stream audio print as a possible new known audio print to be added to the library of known audio prints.

In one aspect of embodiments disclosed herein, the method generates an event as a result of identifying the match. The event may be notifying the application of identification of the match.

In one aspect of embodiments disclosed herein, the method constructs, at the processor, the library of known audio prints by selecting and cropping snippets of audio streams containing audio that the application desires to detect. The method generates a synthetic audio print from a plurality of similar audio streams containing audio that the application desires to detect, where the library of known audio prints comprises audio prints and synthetic audio prints.

In one aspect of embodiments disclosed herein, the method constructs, at the processor, the library of known audio prints from pre-recorded audio stream segments provided by the application. The library of known audio prints comprises known audio prints and synthetic audio prints. The known audio print is created by determining periods of silence in the pre-recorded audio stream segments where energy is less than a tunable threshold, to create a silence constraint associated with the known audio print. The method selects temporal points within the known audio print, and determines component data at the temporal points. The method generates a synthetic audio print from a plurality of similar audio streams from the pre-recorded audio stream segments provided by the application.

In one aspect of embodiments disclosed herein, when the method generates the synthetic audio print, the method performs the signal analysis on a plurality of similar audio streams to generate a plurality of stream audio prints, where the plurality of stream audio prints match at least one known audio print. The method performs a statistical comparison on the plurality of stream audio prints to determine common frequencies among the plurality of stream audio prints, and frequencies within the plurality of stream audio prints that most often match at least one frequency associated with at least one known audio print. The method generates the synthetic audio print from the common frequencies among the plurality of stream audio prints, and the frequencies within the plurality of stream audio prints that most often match at least one frequency associated with at least one known audio print.

In one aspect of embodiments disclosed herein, the method uses the synthetic audio print as the known audio print when determining the potential match, and when computing the total scoring metric function.

In one aspect of embodiments disclosed herein, when the method performs the signal analysis on the audio stream, the method determines at least two frequencies within the audio stream where the frequencies are selected from a plurality of computed frequencies. The method determines a respective amplitude associated with each of the frequencies, and identifies an amplitude ratio between each of the respective amplitudes.

In one aspect of embodiments disclosed herein, when the method performs the signal analysis on the audio stream, the method identifies at least one period of silence within the audio stream. The period of silence is identified when energy is lower than a percentage of a peak amplitude associated with a respective sample of the audio stream. The percentage is tunable.

In one aspect of embodiments disclosed herein, when the method applies the silence constraint to the potential match, the method temporally matches at least one silence period between the stream audio print and the known audio print.

In one aspect of embodiments disclosed herein, when the method determines the potential match between the stream audio print and the known audio print from the library of known audio prints, the method determines the potential match between at least two frequencies and amplitude ratios associated with the stream audio print, and at least two frequencies and amplitude ratios associated with the known audio print.

In one aspect of embodiments disclosed herein, when the method receives the audio stream, the method receives the audio stream of an outbound telephone call before the telephone call is answered. The audio stream is comprised of at least one of early media, pre-call audio of the telephone call, and ring back audio. The known audio print from the library of known audio prints comprises a library of pre-recorded messages representing messages played by at least one of a telecommunication carrier, a phone company, a mobile phone company, and a ring back tone provider. The pre-recorded messages comprise at least one of voice audio, a period of silence, a special information tone, and a ring tone.

In one aspect of embodiments disclosed herein, when the method receives the audio stream, the method receives the audio stream of an outbound telephone call immediately after the telephone call is answered. The known audio print from the library of known audio prints comprises a library of pre-recorded messages representing messages played by at least one of an answering machine, and a voicemail system. The pre-recorded messages comprise at least one of a default message played by the answering machine if a person receiving the telephone call has not recorded their own greeting, the voicemail system used by a Private Branch Exchange (PBX) system, the voicemail system used by an Automatic Call Distributor (ACD) system, the voicemail system used by a mobile carrier, the voicemail system used by a telephone company, another type of automated answering message played when the person receiving the telephone call does not answer in person, and a beep or tone played by the answering machine or the voicemail system indicating that a caller is to record a message.

In one aspect of embodiments disclosed herein, when the method receives the audio stream, the method receives the audio stream of an outbound telephone call after the telephone call is answered. The known audio print from the library of known audio prints comprises a library of pre-recorded messages representing messages played by an interactive voice response (IVR) system. The pre-recorded messages comprise at least one of voice prompts played by the IVR, and tones played by the IVR.

According to one embodiment disclosed herein, in a method for identifying a digitized stream of audio signals, a processor receives an audio stream from an application. The method, via the processor, performs, at the processor, signal analysis on the audio stream to compute a stream audio print of the audio stream. The audio stream is comprised of sound and silence. The stream audio print is computed on sound and silence. The stream audio print identifies a pattern associated with the audio stream. The pattern is comprised of at least two of sound, silence, frequency, tone, and Dual Tone Multi Frequency (DTMF'). The pattern matches a similar pattern of at least two of sound, silence, frequency, magnitude, duration, tone, and DTMF. The signal analysis is performed on sound and silence within the audio stream. The pattern indicates at least one of an automated device answering a phone call, and a human answering the phone call. The method applies, at the processor, a silence constraint to match periods of silence in the stream audio print to periods of silence from at least one of i) rules in a heuristic engine, and ii) a known audio print from, a library of known audio prints, where the silence constraint is associated with the known audio print. The method determines, at the processor, a potential match between the stream audio print and at least one of the rules in the heuristic engine and the known audio print.

In one aspect of embodiments disclosed herein, the pattern matches a similar pattern of at least two of sound, silence, frequency, magnitude, duration, tone, and DTMF in the heuristic engine or in the known audio print from the library of known audio prints.

In one aspect of embodiments disclosed herein, when the method performs, at the processor, signal analysis on the audio stream to compute the stream audio print of the audio stream, the method receives the audio stream real time as the phone call is answered. The method partitions the audio stream into a plurality of portions as the audio stream is received, and performs the signal analysis on each of the plurality of, portions.

In one aspect of embodiments disclosed herein, when the method performs, at the processor, the signal analysis on each of the plurality of portions, the method identifies a most recent portion from the plurality of portions, and identifies at least one less recent portion from the plurality of portions. The method performs the signal analysis on the most recent portion and data associated with at least one less recent portion to determine at least one of a sound event, silence event, a tone event, and a DTMF event. The data associated with at least one less recent portion comprises signal analysis data and events associated with at least one less recent portion.

In one aspect of embodiments disclosed herein, when the method performs, at the processor, the signal analysis on each of the plurality of portions, the method generates a real time sequence indicating at each sequence point whether a sound event, silence event, tone event, or DTMF event occurs.

In one aspect of embodiments disclosed herein, when the method generates the real time sequence, the method examines the sequence with the heuristic engine to detect the pattern indicating at least one of an automated device answering the phone call, and the human answering the phone call.

In one aspect of embodiments disclosed herein, when the method examines the sequence with the heuristic engine, the method tunes the heuristic engine to accurately determine at least one of the automated device answering a phone call, and the human answering the phone call. Upon detecting the human answering the phone call, the method performs at least one of transferring the call to a human agent to respond to the human answering the phone call, playing a pre-recorded message, playing an interactive voice response script, and notifying the calling application that a human has answered the call. Upon detecting an automated device answering the phone call, the method performs at least one of terminating the call, playing a pre-recorded message, playing a sequence of pre-recorded messages to the automated device, and notifying the application that an automated device has answered the call.

In one aspect of embodiments disclosed herein, the known audio print library is comprised of a plurality of audio prints of known automated devices. Upon detecting a known automated device audio print, the performs at least one of terminating the call, awaiting a tone and playing at least one of a sequence of pre-recorded messages to the automated device, and notifying the application that an automated device has answered the call. Upon detecting the automated device answering the phone call, the method determines the stream audio print associated with the automated device answering the phone call, and identifies the stream audio print as a possible new known audio print to be added to the library of known audio prints.

In one aspect of embodiments disclosed herein, when the method tunes the heuristic engine to accurately determine at least one of the automated device answering a phone call, and the human answering the phone call, the method analyzes a timing associated with at least one of the sound and the silence to accurately determine at least one of the automated device answering a phone call, and the human answering the phone call.

In one aspect of embodiments disclosed herein, when the method performs the signal analysis on the most recent portion and data associated with at least one less recent portion, the method detects the tone in the most recent portion, and determines that an automated device has answered the call.

In one aspect of embodiments disclosed herein, when the method performs the signal analysis on the most recent portion and data associated with at least one less recent portion, the method detects the DTMF in the most recent portion, and determines that a live human has answered the call. Upon receiving the silence event, the method plays at least one of the pre-recorded message and the interactive voice response script. Upon receiving the sound event during the playing of the pre-recorded message or the interactive voice response script, the method ceases at least one of the pre-recorded message and the interactive voice response script where the sound event is at least one of the automated device answering the phone call and the human answering the phone call. Until the method determines the automated device is answering the phone call or the human is answering the phone call, the method performs the steps of i) playing at least one of the pre-recorded message and the interactive voice response script and ii) ceasing at least one of the pre-recorded message and the interactive voice response script.

In one aspect of embodiments disclosed herein, when the method examines the sequence with the heuristic engine, the method performs at least one of tuning the heuristic engine to return a result within a predetermined period of time, tuning the heuristic engine to return the result regardless of the predetermined period of time, where the heuristic engine determines the automated device answering the phone call or the human answering the phone call.

In one aspect of embodiments disclosed herein, when the method performs the signal analysis on each of the plurality of portions, the method determines the frequency associated with the tone detected in a portion. The method weights the tone, based on the frequency, to determine at least one of whether the automated device is answering the phone call, or the human answering the phone call.

In one aspect of embodiments disclosed herein, when the method determines the frequency associated with a tone detected in a portion, the method detects that the frequency exceeds a threshold associated with a human voice. The method determines the automated device is answering the phone call based on the frequency.

In one aspect of embodiments disclosed herein, when the method weights the tones, the method establishes a probability associated with the frequency. The probability that the frequency is associated with the automated device answering the phone call diminishes as the frequency is identified as a lower frequency than a higher frequency. The probability that the frequency is associated with the automated device answering the phone call increases as the frequency is identified as the higher frequency.

In one aspect of embodiments disclosed herein, when the method determines the frequency associated with the tone detected in a portion, the method identifies a highest value frequency in the portion, and identifies the tone associated with the highest value frequency in the portion as a dominant tone in the portion.

In one aspect of embodiments disclosed herein, when the method identifies the highest value frequency in the portion, the method tracks a plurality of tones in the portion. The method eliminates any tones that drop out in the portion, and identifies the highest value frequency from the remaining tones in the portion.

In one aspect of embodiments disclosed herein, when the method identifies the tone associated with the highest value frequency in the portion as a dominant tone in the portion, the method tracks a plurality of frequencies in the portion. The method identifies the highest frequency as being a predetermined percentage higher than a next highest frequency, and identifies the tone associated with the highest frequency as the only dominant tone in the portion.

According to one embodiment disclosed herein, in a method for determining whether a phone call is answered by an automated device or a human, a processor receives an audio stream from an application. The method, via the processor, performs signal analysis on the audio stream to compute a sequence of events, where the audio stream is comprised of sound and silence, and where the sequence of events is computed on sound and silence. The sequence of events identifies a pattern associated with the audio stream. The pattern is comprised of at least two of sound, silence, frequency, magnitude, duration, tone, and Dual Tone Multi Frequency (DTMF), where the pattern matches a similar pattern of at least two of sound, silence, frequency, magnitude, duration, tone, and DTMF. The signal analysis is performed on sound and silence within the audio stream. The similar pattern is associated with at least one of the automated device answering a phone call, and the human answering the phone call. The method determines, at the processor, whether the sequence of events indicates the phone call is answered by the automated device or the human based on at least one of the (i) rules in the heuristic engine, and (ii) a known audio print from a library of known audio prints. In an example embodiment, the method may notify the application that the sequence of events has been identified as a phone call answered by the automated device and/or the human.

In one aspect of embodiments disclosed herein, the pattern matches a similar pattern of at least two of sound, silence, frequency, magnitude, duration, tone, and DTMF in the heuristic engine or in the known audio print from the library of known audio prints.

In one aspect of embodiments disclosed herein, when the method performs signal analysis on the audio stream to compute the sequence of events in the audio stream, the method receives the audio stream real time as the phone call is answered. The method partitions the audio stream into a plurality of portions as the audio stream is received, and performs the signal analysis on each of the plurality of portions.

In one aspect of embodiments disclosed herein, when the method performs the signal analysis on each of the plurality of portions, the method identifies a most recent portion from the plurality of portions. The method identifies at least one less recent portion from the plurality of portions, and performs the signal analysis on the most recent portion and data associated with at least one less recent portion to determine at least one of a sound event, silence event, a tone event, and a DTMF event, an automated device answering the phone call event, and a human answering the phone call event, where the data associated with at least one less recent portion comprises signal analysis data and events associated with at least one less recent portion.

In one aspect of embodiments disclosed herein, when the method performs the signal analysis on each of the plurality of portions and data associated with at least one less recent portion, the method calculates, from the most recent portion and data associated with at least one less recent portion, values comprising at least one of duration of an entire stream, average magnitude of the portions, maximum magnitude of the portion, noise threshold, frequencies seen in the portion, duration of persistent frequencies, frequency of current dominant tone, duration of current dominant tone, overall duration of all silence portions, and duration of most recent silence portion. The method generates a real time sequence indicating at each sequence point whether at least one of the sound event, silence event, tone event, DTMF, automated device answering the phone call event, and human answering the phone call event occurs.

In one aspect of embodiments disclosed herein, when the method generates the real time sequence, the method examines the values with the heuristic engine to detect the pattern indicating at least one of the sound event, silence event, tone event, DTMF, automated device answering the phone call event, and human answering the phone call event.

In one aspect of embodiments disclosed herein, when the method examines the values with the heuristic engine, the method utilizes at least one of a threshold, constraints, and parameters to examine the values calculated, where the threshold, constraints, and parameters are comprised of at least one of tone magnitude threshold, tone noise factor, tone minimum frequency, tone maximum frequency, silence threshold, portion non-silence percent, maximum initial silence, maximum greeting, tone portion percent, low frequency start index, frequency drift, tone maximum range, and gap portions permitted in the tone to calculate a weighted likelihood that at least one of the sound event, silence event, tone event, DTMF, automated device answering the phone call event, and human answering the phone call event has occurred. The method tunes the threshold, constraints and parameters to accurately determine at least one of the sound event, silence event, tone event, DTMF, automated device answering the phone call event, and human answering the phone call event. Upon detecting the human answering the phone call, the method performs at least one of i) transferring the call to a human agent to respond to the human answering the phone call, ii) playing a pre-recorded message, iii) playing an interactive voice response script, and iv) notifying the calling application that a human has answered the call. Upon detecting an automated device answering the phone call the method performs at least one of i) terminating the call, ii) playing a pre-recorded message, iii) playing a sequence of pre-recorded messages to the automated device, and iv) notifying the application that an automated device has answered the call.

In one aspect of embodiments disclosed herein, when the method performs, at the processor, signal analysis on the audio stream to compute a sequence of events in the audio stream, the method receives the audio stream real time as the phone call is answered. When a duration of the audio stream exceeds a duration of the known audio print by a multiple of a tunable interval, the method computes a stream audio print on the audio stream and determines whether the stream audio print matches the known audio print.

In one aspect of embodiments disclosed herein, the known audio print library is comprised of the plurality of audio prints of known automated devices. Upon detecting the known automated device audio print, the method performs at least one of i) terminating the phone call, ii) awaiting the tone and playing at least one of a sequence of pre-recorded messages to the automated device, and iii) notifying the application that the automated device has answered the phone call. Upon detecting the automated device answering the phone call, the method determines the sequence of events is associated with the automated device answering the phone call, and identifies the sequence of events as a possible new known audio print to be added to the library of known audio prints.

In one aspect of embodiments disclosed herein, when the method tunes the heuristic engine to accurately determine at least one of the sound event, silence event, tone event, DTMF, the automated device answering the phone call event, and the human answering the phone call event, the method performs the signal analysis on a plurality of call recordings with known data for each of the plurality of call recordings, where the known data comprises at least one of timing and occurrence of at least one of sound event, silence event, tone event, DTMF events, automated device answering the phone call event, and human answering the phone call event. The method compares the heuristic engine output to the known data. The method adjusts the heuristic engine tunable parameters to improve accuracy. The method repeats the performing the signal analysis on the plurality of call recordings, comparing the heuristic engine and adjusting the heuristic engine to obtain a high accuracy rate on the plurality of call recordings.

In one aspect of embodiments disclosed herein, when the method performs the signal analysis on the most recent portion and data associated with at least one less recent portion, the method detects the tone in the most recent portion, and determines that an automated device has answered the call.

In one aspect of embodiments disclosed herein, when the method performs the signal analysis on the most recent portion and data associated with at least one less recent portion, the method detects the DTMF in the most recent portion, the method determines that a live human has answered the call. Upon receiving the silence event, the method plays at least one of the pre-recorded message and the interactive voice response script. Upon receiving the sound event during the playing of the pre-recorded message or the interactive voice response script, the method ceases at least one of the pre-recorded message and the interactive voice response script where the sound event is at least one of the automated device answering the phone call and the human answering the phone call. Until the method determines the automated device answering the phone call or the human answering the phone call, the method performs the steps of i) playing at least one of the pre-recorded message and the interactive voice response script, and ii) ceasing at least one of the pre-recorded message and the interactive voice response script.

In one aspect of embodiments disclosed herein, when the method examines the sequence with the heuristic engine, the method tunes the heuristic engine to return a result within a limited period of time, and/or tunes the heuristic engine to return the result regardless of a limitation on time, where the heuristic engine determines the automated device answering the phone call or the human answering the phone call.

In one aspect of embodiments disclosed herein, when the method performs the signal analysis on each of the plurality of portions, the method determines the frequency associated with the tone detected in a portion. The method weights the tone, based on the frequency, to determine if the tone comprises at least one of the tone event and the automated device answering the call event.

In one aspect of embodiments disclosed herein, when the method determines the frequency associated with a tone detected in a portion, the method detects that the frequency is within a threshold associated with automated devices. The method determines the automated device is answering the phone call based on the frequency.

In one aspect of embodiments disclosed herein, when the method weights the tone, the method establishes a probability associated with the frequency, where the probability that the frequency is associated with the automated device answering the phone call diminishes as the frequency is identified as a lower frequency than a higher frequency, and where the probability that the frequency is associated with the automated device answering the phone call increases as the frequency is identified as the higher frequency.

In one aspect of embodiments disclosed herein, when the method determines the frequency associated with the tone detected in a portion, the method identifies a strongest frequency in the portion, and identifies the tone associated with the strongest frequency in the portion as a dominant tone in the portion.

In one aspect of embodiments disclosed herein, when the method identifies the strongest frequency in the portion, the method tracks a plurality of tones in the portion. The method eliminates any tones that drop out in the portion, and identifies the strongest frequency from the remaining tones in the portion.

In one aspect of embodiments disclosed herein, when the method identifies the tone associated with the strongest frequency in the portion as the dominant tone in the portion, the method tracks a plurality of frequencies in the portion. The method identifies the strongest frequency as being a predetermined percentage stronger than a next strongest frequency. The method then identifies the tone associated with the strongest frequency as the only dominant tone in the portion.

System and computer program products corresponding to the above-summarized methods are also described and claimed herein.

BRIEF DESCRIPTION OF THE SEVERAL VIEWS OF THE FIGURES

FIG. 4 is a flowchart illustrating an embodiment of a method for matching a digitized stream of audio signals to a known audio recording where the method computes a total scoring metric function, according to embodiments disclosed herein.

FIG. 7 is a flowchart illustrating an embodiment of a method for matching a digitized stream of audio signals to a known audio recording where the method determines if application of the silence constraint is successful or not, according to embodiments disclosed herein.

FIG. 8 is a flowchart illustrating an embodiment of a method for matching a digitized stream of audio signals to a known audio recording where the method constructs the library of known audio prints, according to embodiments disclosed herein.

FIG. 9 is a flowchart illustrating an embodiment of a method for matching a digitized stream of audio signals to a known audio recording where the method performs signal analysis on the audio stream, according to embodiments disclosed herein.

FIG. 10 is a flowchart illustrating an embodiment of a method for matching a digitized stream of audio signals to a known audio recording where the method applies a silence constraint, according to embodiments disclosed herein.

FIG. 11 is a flowchart illustrating an embodiment of a method for matching a digitized stream of audio signals to a known audio recording where the method determines a potential match between the stream audio print and the known audio print, according to embodiments disclosed herein.

FIG. 12 is a flowchart illustrating an embodiment of a method for matching a digitized stream of audio signals to a known audio recording where the method receives the audio stream of an outbound telephone call before the call is answered, according to embodiments disclosed herein.

FIG. 13 is a flowchart illustrating an embodiment of a method for matching a digitized stream of audio signals to a known audio recording where the method receives the audio stream of an outbound telephone call immediately after the call is answered, according to embodiments disclosed herein.

DETAILED DESCRIPTION

Figure 1:
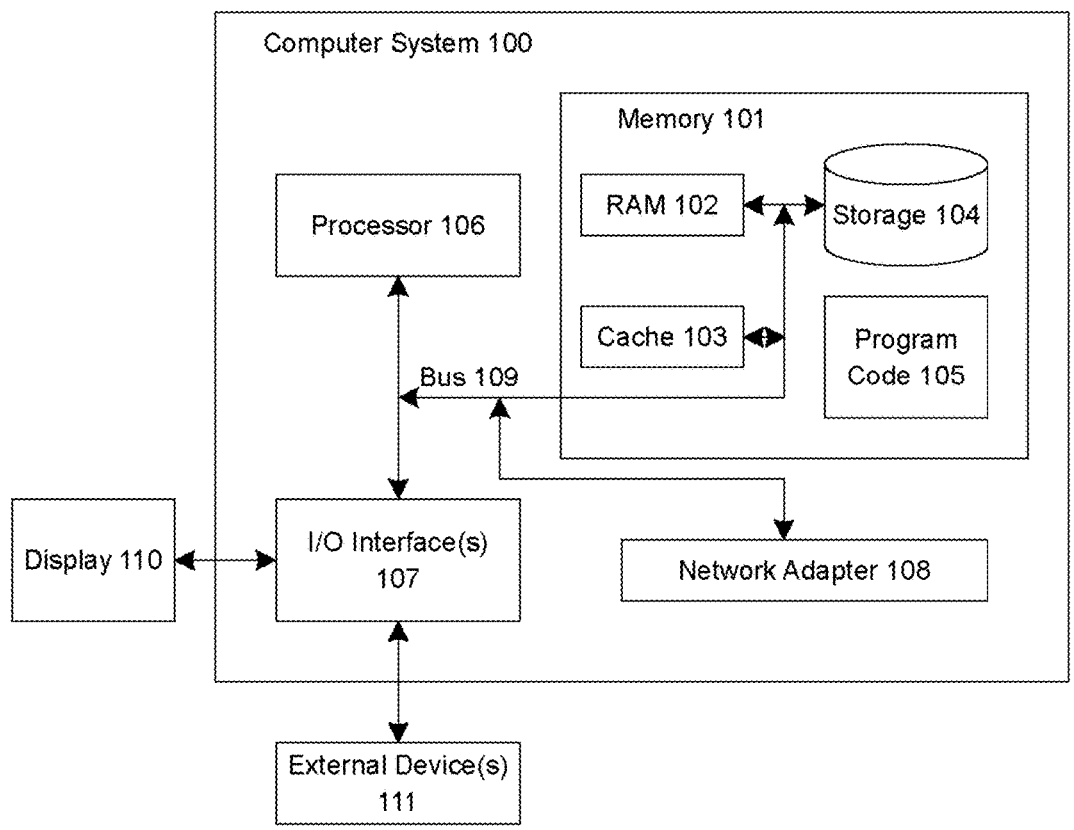
FIG. 1 illustrates an embodiment of a system for matching a digitized stream of audio signals to a known audio recording, according to embodiments disclosed herein.

Embodiments disclosed herein provide matching a digitized stream of audio signals to a known audio recording. The following description is presented to enable one of ordinary skill in the art to make and use embodiments disclosed herein, and are provided in the context of a patent application and its requirements. Various modifications to the embodiment will be readily apparent to those skilled in the art and the generic principles herein may be applied to other embodiments. Thus, embodiments disclosed herein are not intended to be limited to the embodiment shown but is to be accorded the widest scope consistent with the principles and features described herein.

Embodiments disclosed herein can take the form of an entirely hardware embodiment, an entirely software embodiment or an embodiment containing both hardware and software elements. In a preferred embodiment, embodiments disclosed herein are implemented in software, which includes but is not limited to firmware, resident software, microcode, etc.

Furthermore, embodiments disclosed herein can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of embodiments disclosed herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a system for matching a digitized stream of audio signals to a known audio recording according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or with one or more external devices 111, such as a display 110, via I/O interfaces 107. The memory 101 may include computer readable media in the form of volatile memory, such as random access memory (RAM) 102 or cache memory 103, or non-volatile storage media 104. The memory 101 may include at least one program product having a set of at least one program code modules 105 that are configured to carry out the functions of embodiments of the present invention when executed by the processor 106. The computer system 100 may communicate with one or more networks via network adapter 108.

Figure 2:
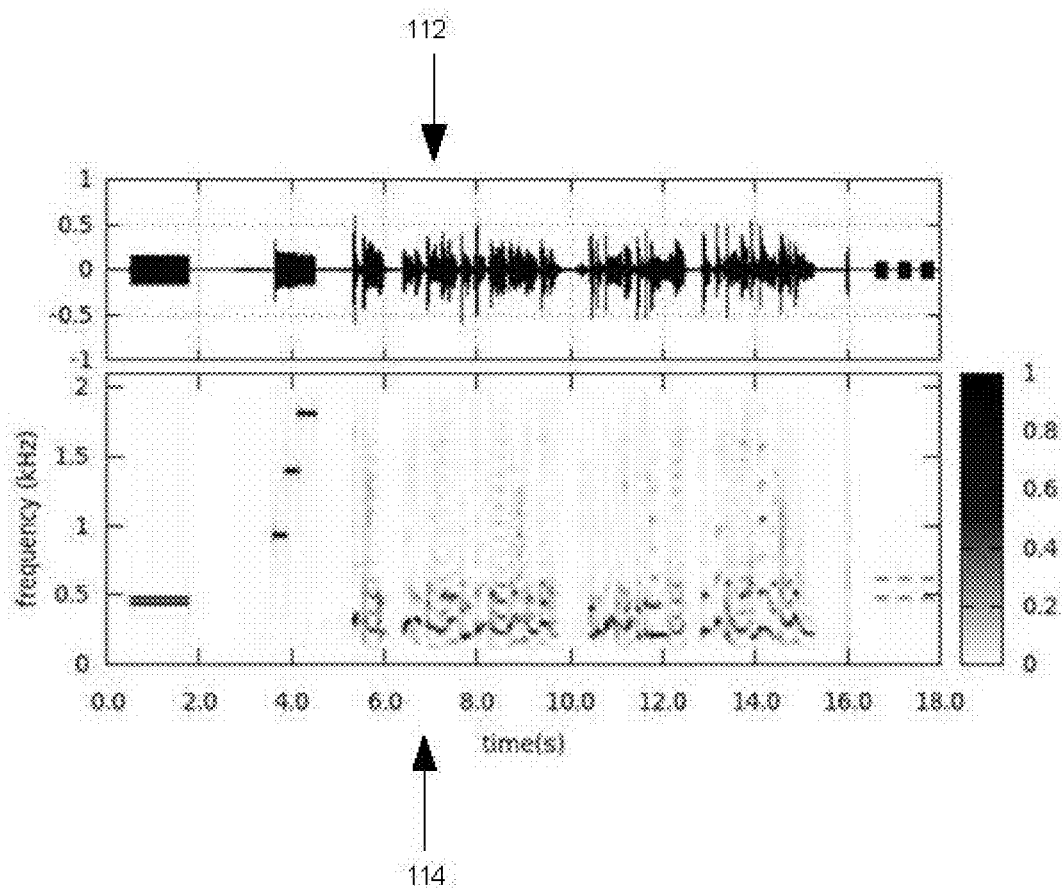
FIG. 2 illustrates an audio waveform with its corresponding spectrogram, according to embodiments disclosed herein.

FIG. 2 illustrates an example waveform 112 and frequency response 114 of a telephony Early Media example. "Early Media" refers to audio heard by a caller once a call is placed, but before it is answered by the party being called (e.g., ringing, a busy signal, and messages such as "The number you are trying to reach has been disconnected"). The waveform 112 (starting at time=0) begins with a standard ring tone, a set of three special information tones (SIT), some human voice audio, and three fast busy tones. Audible telephony call progress tones are standards based. A standard ring tone is delivered as an audio signal with dual overlapped frequencies of equal amplitude, one at 440 Hz and the other at 480 Hz, with 2 seconds on and 4 seconds off. A busy tone consists of dual frequencies at 480 Hz and 620 Hz, for 0.5 seconds on and 0.5 seconds off. A fast busy, or reorder tone, has the same frequency characteristics as a busy tone, however it is shorter, 0.25 seconds on, and 0.25 seconds off. Special information tones consist of three, single frequency, rising tones. The frequency and duration of these three tones can be modified to indicate different signaling information. Dual tone multi-frequency tones (DTMF) are another example of dual tones that carry signaling information. Voice audio is characterized by a continuously changing set of frequencies. Any given segment of voice audio may contain numerous frequencies with varying amplitude.

Figure 3:
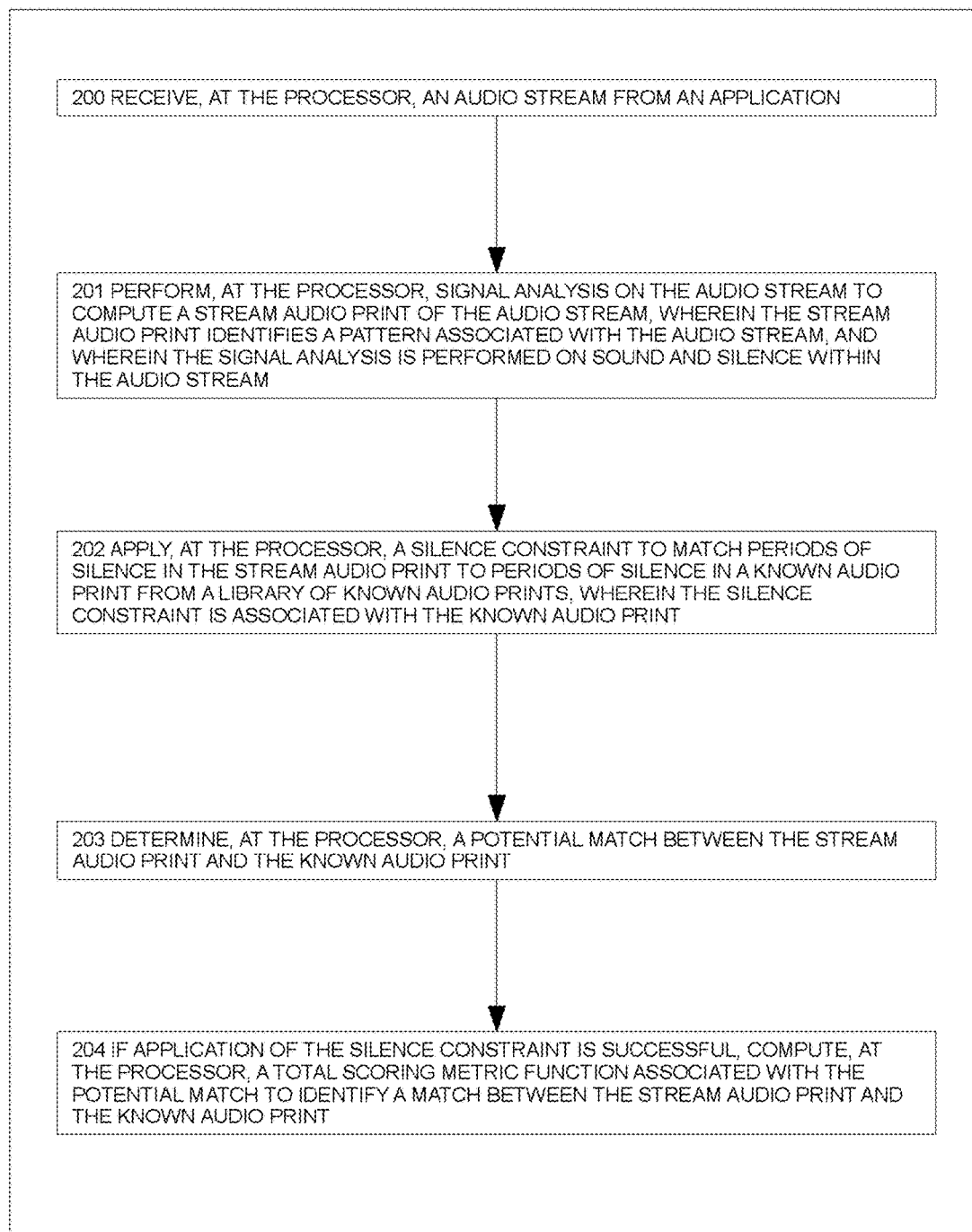
FIG. 3 is a flowchart illustrating an embodiment of a method for matching a digitized stream of audio signals to a known audio recording, according to embodiments disclosed herein.

FIG. 3 is a flowchart of an example embodiment of embodiments disclosed herein for matching a digitized stream of audio signals to a known audio recording according. In 200, the method receives, at a processor 106, an audio stream from an application. In an example embodiment, the audio stream may be early media or pre-call audio received when placing an outbound telephone call. The audio stream may also be a recorded telephony message from an Interactive Voice Response (IVR) system, Private Branch Exchange (PBX), answering machine, Automatic Call Distributor (ACD), or other automated telephone messaging systems. In another example embodiment, the audio stream may be a radio program, live or recorded, where matching is performed to determine if, for example, commercials were played during the radio program. The matching may be performed to determine if the content of the commercials was correct, if the commercial was played a correct number of times, at the correct portions of the ratio program, etc. The audio stream may also be received via the Internet. The audio stream may also be received from a microphone of a smart phone as part of an application.

In 201, the method performs, at the processor 106, signal analysis on the audio stream to compute a stream audio print of the audio stream. The stream audio print identifies a pattern associated with the audio stream. The signal analysis is performed on sound and silence within the audio stream. The signal analysis may be performed using a variety of methods. In an example embodiment, given an audio stream (i.e., a digital audio signal):

$$x(t_i), i=0,\ldots,\infty$$

The audio stream is sampled at a rate of N samples per second. Then, a discrete Fourier transform (DFT) is computed of overlapped, windowed segments of the audio signal of length M, overlapped by length L. In an example embodiment, a Hamming window is used, but any number of other windows may be chosen. The DFT produces a spectrogram (i.e., the frequency response 114), with frequency and amplitude components of the signal at discrete points in time. The choice of M and L is tunable, and may impact the calculation results. For example, given an audio stream, sampled at N=8000 samples per second, selection of a window length M=800 will produce a frequency resolution of N/M, or 10 Hz, when the DFT is computed. Selection of L=160 samples, results in the temporal resolution of 160/8000, or 0.02 seconds.

In another example embodiment, for ringing tones and special information tones (SIT tones), the method computes a stream audio print from the tone characteristics without any sampling of examples. For example, a standard ring tone heard when placing an outbound telephone call may be of 2 seconds duration, with two overlapped frequencies, at 440 Hz and 480 Hz, followed by a period of silence. The amplitude of the two frequencies should be the same, so the ratio between the two is unity.

In 202, the method applies, at the processor 106, a silence constraint to match periods of silence in the stream audio print to periods of silence in a known audio print from a library of known audio prints, where the silence constraint is associated with the known audio print. In an example embodiment, the signal analysis is computed on voice, SIT and silence portions of the audio stream. Computation of the signal analysis produces the stream audio print that is then compared to a known audio print from a library of known audio prints. In an example embodiment, prior to the comparison, a silence constraint is applied to the audio stream to match periods of silence in the audio stream to periods of silence in the known audio print. In another example embodiment, the periods of silence in the audio stream must match, temporally, the periods of silence in the known audio print. In other words, the periods of silence in the audio stream must occur at the same points where the periods of silence occur in the known audio print. In yet an example embodiment, if the periods of silence in the audio stream do not match the periods of silence in the known audio print, then the method determines a match has not been made between the audio stream and the known audio print. In an example embodiment, the method continues to compare the stream audio print at each point in time with a plurality of known audio prints from the library of known audio prints to determine if any of the known audio prints are detected by the method. For example, the method applies the silence constraint to the stream audio print. If application of the silence constrain is successful with one of the known audio prints, the method then computes the scoring function. If application of the silence constraint is not successful, then the method continues to apply the silence constraint using other known audio prints from the library of known audio prints.

In 203, the method determines, at the processor 106, a potential match between the stream audio print and the known audio print. In an example embodiment, the method performs the signal analysis, and applies the silence constraint to the audio stream. If the comparison is successful, meaning the audio stream has periods of silence at the same temporal points as the known audio print, then the method determines a potential match has been made, and continues the comparison by computing the total scoring metric function.

FIG. 4 is a flowchart of an example embodiment for computing a total scoring metric function associated with the potential match.

In 204, as noted above if application of the silence constraint is successful, the method computes, at the processor 106, a total scoring metric function associated with the potential match, to identify a match between the stream audio print and the known audio print.

In 205, the method overlays the stream audio print with the known audio print. The method overlays the stream audio print with the known audio print to determine if there are matches between the stream audio print and known audio print, at the same temporal points. In an example embodiment, the method may only be interested in detecting a subset of the known audio prints from the library of known audio prints, and performs the comparison to detect only those known audio prints that the method is interested in detecting. In another example embodiment, the method may be interested in detecting any of the known audio prints from the library of known audio prints, and performs the comparison using all of the known audio prints in the library of known audio prints.

In 206, the method computes a scoring metric function at a subset of temporal points. In an example embodiment, the method compares the stream audio print at each point through the use of a scoring metric function such as the following example:

$$f(A_p(t_i), A(t_i)) = \alpha(\omega_{p1} - \omega_1) + \gamma(a_{pr} - a_r)$$

where $A_p(t_i)$ refers to the known audio print, $A(t_i)$ refers to the stream audio print, and $f(A_p(t_i), A(t_i))$ is the scoring metric function which computes a measure of the closeness of the known audio print and the stream audio print at the temporal point. Other examples of scoring metric functions may also be used.

In 207, the method sums a result of the scoring metric function at each of the subset of temporal points to create a total score metric. The total score metric is a result of the total scoring metric function. In an example embodiment, the summing equation for the total scoring metric function at each of the subset of temporal points may be an equation such as:

$$\Omega(t_k) = \frac{1}{N_p} \sum_{i=0}^{N_m} \int (A_p(t_i), A(t_i))$$

where total score metric tends to zero when the frequency components of the stream audio print and the known audio print match, and their amplitude ratios are equivalent. Other calculations may also be used to create the total score metric.

Figure 5A:
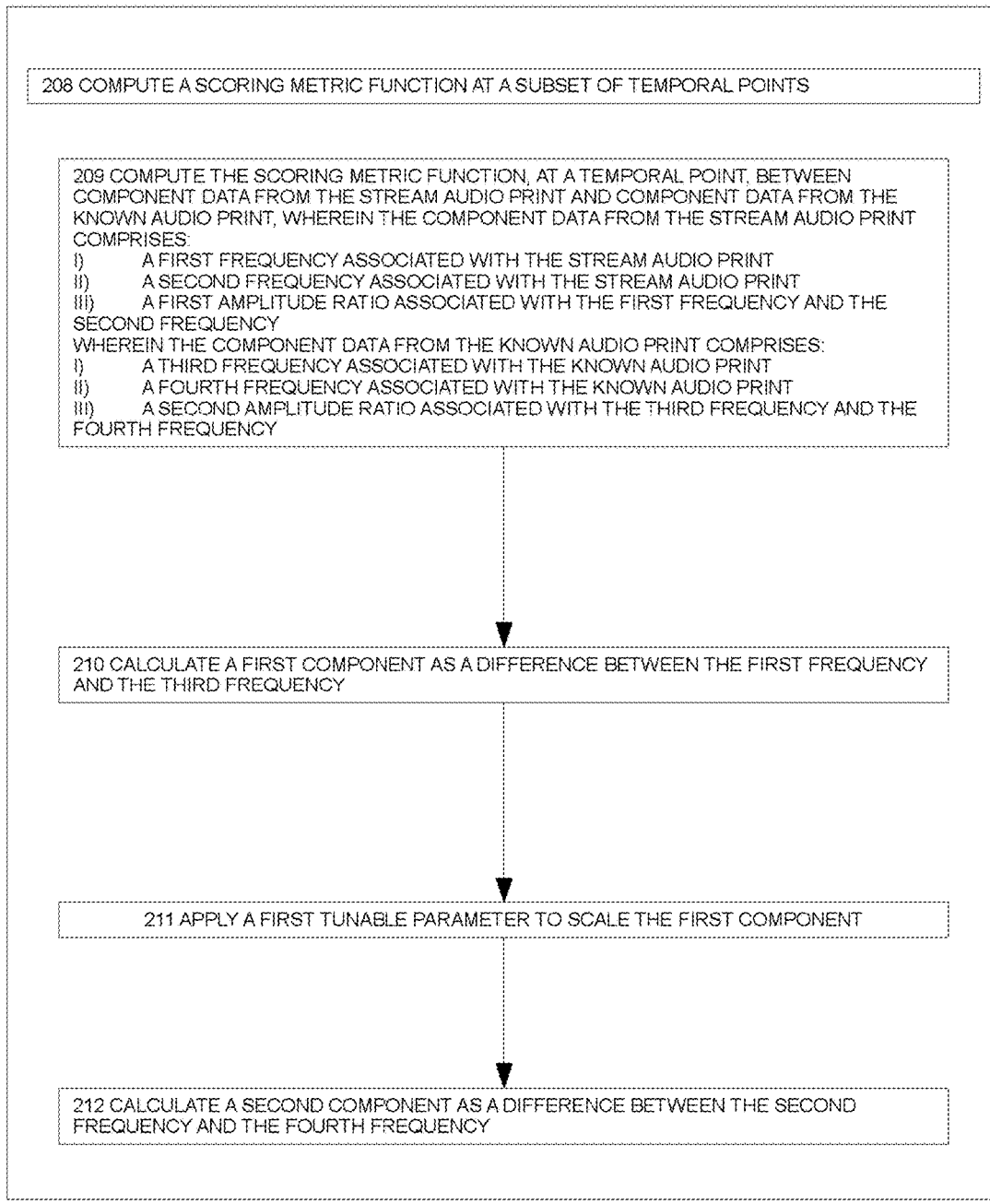
FIG. 5a is a flowchart illustrating an embodiment of a method for matching a digitized stream of audio signals to a known audio recording where the method computes a scoring metric function at a subset of temporal points, according to embodiments disclosed herein.

FIG. 5a is a flowchart of an example embodiment for computing a scoring metric function at a subset of temporal points.

In 208, the method computes a scoring metric function at a subset of temporal points. In an example embodiment, the method performs signal analysis on the audio stream to produce a set of frequency and amplitude data for each temporal point in the subset of temporal points. The method then computes the scoring metric function at each temporal point using the frequency and amplitude data.

In 209, the method computes the scoring metric function, at a temporal, point, between component data from the stream audio print, and component data from the known audio print. In this example embodiment, the component data from the stream audio print comprises:
i) a first frequency associated with the stream audio print,
ii) a second frequency associated with the stream audio print, and
iii) a first amplitude ratio associated with the first frequency and the second frequency.

The component data from the known audio print comprises:
i) a third frequency associated with the known audio print,
ii) a fourth frequency associated with the known audio print, and,
iii) a second amplitude ratio associated with the third frequency and the fourth frequency.

In an example embodiment, when the method performs a signal analysis to produce a set of points for each temporal point in the subset of temporal points, each set of points comprises two frequencies associated with the stream audio print (i.e., the first frequency and the second frequency) and an amplitude ratio of the two frequencies. The known audio print also has two frequencies (i.e., the third frequency and the fourth frequency) associated with the known audio print, and an amplitude ratio associated with the two known audio print frequencies. In another example embodiment, the method may compute more than two frequencies for the stream audio print. In this scenario, the known audio print would likewise also have more than two frequencies.

In 210, the method calculates a first component as a difference between the first frequency and the third frequency. As noted above in 207, an example of calculating the scoring metric function at each of the subset of temporal points may be $$f(A_p(t_i), A(t_i)) = \alpha(\omega_{p1} - \omega_1) + \beta(\omega_{p2} - \omega_2) + \gamma(a_{pr} - a_r)$$

In an example embodiment, the method calculates the difference between the $\omega_{p1}$ (i.e., the third frequency associated with the known audio print), and $\omega_1$ (i.e., the first frequency associated with the stream audio print).

In 211, the method applies a first tunable parameter to scale the first component. In an example embodiment, the method applies a as the first tunable parameter to the $(\omega_{p1} - \omega_1)$ equation.

In 212, the method calculates a second component as a difference between the second frequency and the fourth frequency. In an example embodiment, the method calculates the difference between $\omega_{p2}$ (i.e., the fourth frequency associated with the known audio print) and $\omega_2$ (i.e., the second frequency associated with the stream audio print).

In 213, the method applies a second tunable parameter to scale the second component. In an example embodiment, the method applies 13 as the second tunable parameter to the $(\omega_{p2} - \omega_2)$ equation.

In 214, the method calculates a third component as a difference between the first amplitude ratio and the second amplitude ratio. In an example embodiment, the method calculates the difference between $a_{pr}$ (i.e., second amplitude ratio) and $a_r$ (i.e., the first amplitude ratio).

In 215, the method applies a third tunable parameter to scale the third component. In an example embodiment, the method applies $\gamma$ as the third tunable parameter to the $(a_{pr}-a_r)$ equation.

In 216, the method sums the first component, the second component, and the third component to calculate the scoring metric function. Each of the first, second and third tunable parameters is chosen to scale an influence that the respective first, second, and third component has on the result of the scoring metric function. In an example embodiment, the first tunable parameter, for example $\alpha$, is chosen to scale an influence that the $(\omega_{p1}-\omega_1)$ equation has on the result of the scoring metric function, the second tunable parameter, for example $\beta$, is chosen to scale an influence that the $(\omega_{p2}-\omega_2)$ equation has on the result of the scoring metric function, and the third tunable parameter, for example $\gamma$, is chosen to scale an influence that the $(a_{pr}-a_r)$ equation has on the result of the scoring metric function.

In 217, the method determines the match between the stream audio print and the known audio print when the total scoring metric is a low value, where, for example, the low value is less than a tunable threshold. In an example embodiment, the difference between the stream audio print and known audio print frequencies should be near zero, as well as the difference between the stream audio print and known audio print amplitude ratios.

Figure 6:
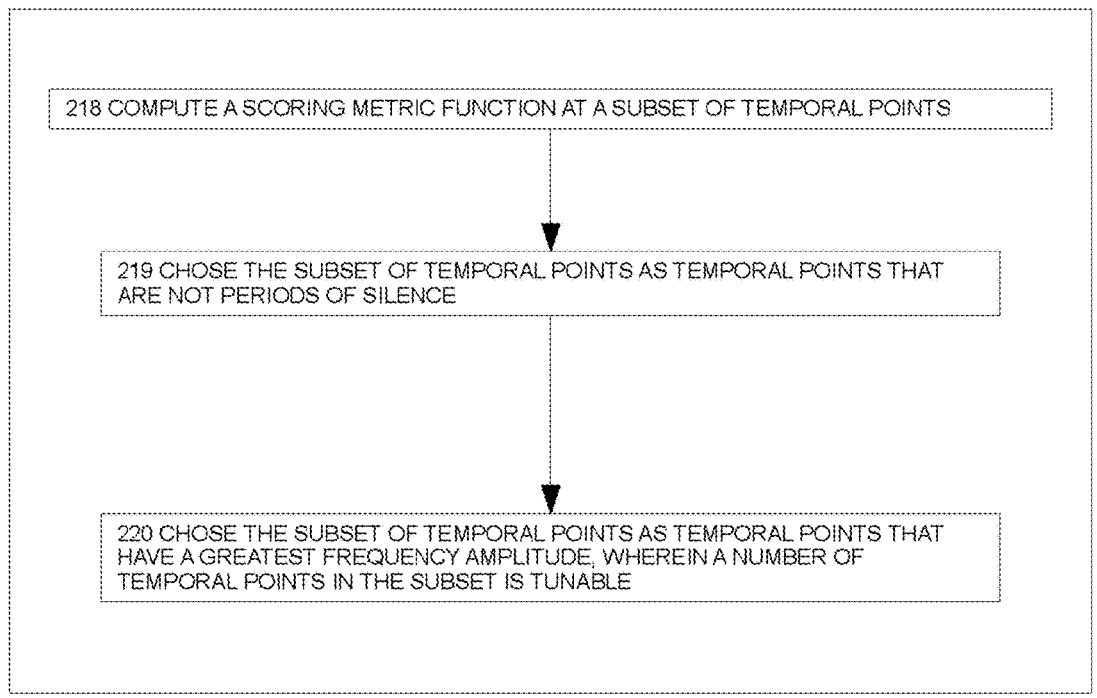
FIG. 6 is a flowchart illustrating an embodiment of a method for matching a digitized stream of audio signals to a known audio recording where the method computes a scoring metric function at a subset of temporal points, and chooses the subset of temporal points as temporal points that are not periods of silence, according to embodiments disclosed herein.
Figure 14:
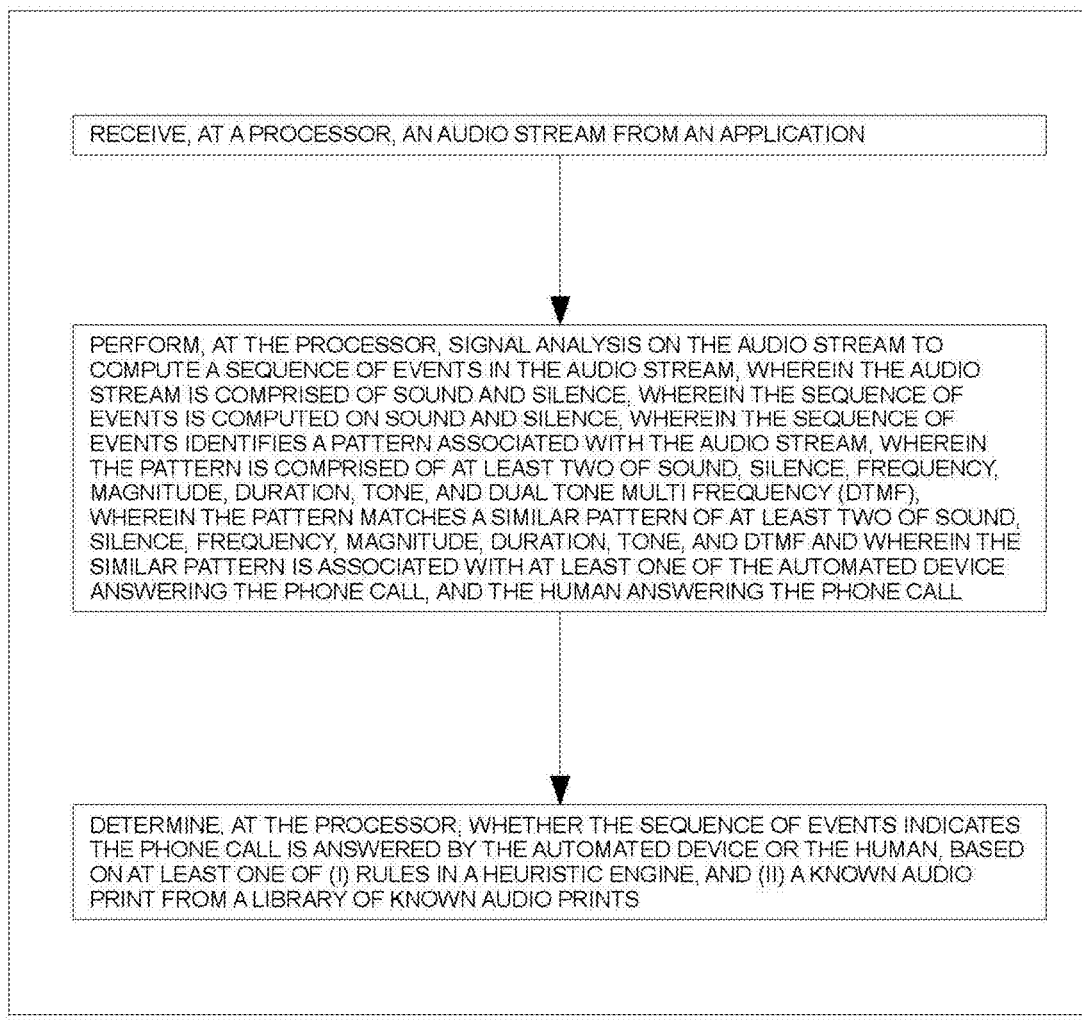
FIG. 14 is a flowchart illustrating an embodiment of a method for determining whether a phone call is answered by an automated device or a human, according to embodiments disclosed herein.

FIG. 6 is a flowchart of an example embodiment for computing a scoring metric function at a subset of temporal points.

In 218, the method computes a scoring metric function at a subset of temporal points. In an example embodiment, the method performs a signal analysis to produce a set of points for each temporal point in the subset of temporal points. The method then applies the silence constraint to the set of points to determine if there is a match between periods of silence in the audio stream and periods of silence in the known audio print. If there is a match (meaning application of the silence constraint is successful), then the method computes the scoring metric function at each of the subset of temporal points. In an example embodiment, the method may choose the subset of temporal points at which to compute the scoring metric function. For example, the subset of temporal points may be chosen at the time the known audio print is created. The technique for choosing the subset of temporal points may vary, for example, the method may select the most "energetic" non-silence points (according to a tunable value) for the number of points to choose. In another example embodiment, the method may choose the points that have the biggest difference between a first and second frequency, or points that have a specific frequency, as one of the frequencies, etc.

In 219, the method chooses the subset of temporal points as temporal points that are not periods of silence. In an example embodiment, the method chooses the subset of temporal points that have SIT (Special Information Tones), voice audio, call progress tones, etc., but does not choose temporal points that contains what the method has determined to be periods of silence within the audio stream. In another example embodiment, the subset of temporal points may be chosen to fulfill specific requirements, such as 5 points per second of non-silent audio in the audio stream.

In 220, the method chooses the subset of temporal points as temporal points that have the greatest frequency amplitude, where the number of temporal points in the subset is tunable. In an example embodiment, the method chooses the subset of temporal points as temporal points that have been determined to have the greatest frequency amplitude. Those temporal points with the greatest frequency amplitude may be chosen, for example, as the least likely to be obscured by the presence of noise.

FIG. 7 is a flowchart of an example embodiment for computing a total scoring metric function associated with the potential match to identify a match between the stream audio print and the known audio print, if application of the silence constraint is successful.

In 221, if application of the silence constraint is successful, the method computes a total scoring metric function associated with the potential match to identify a match between the stream audio print and the known audio print.

In 222, the method performs the signal analysis, applies the silence constraint, determines the potential match, and computes the total scoring metric function, real time, on the audio stream as the audio stream is received. In an example embodiment, the known audio prints are pre-recorded short audio segments, and the method determines the match between the known audio print, and segments within a longer audio stream as the audio stream is received in real time. In another example embodiment, the steps of performing the signal analysis, applying the silence constraint, determining the potential match, and computing the total scoring metric function are optimized for voice audio and telephony tone based on signaling mechanisms such as DTMF, SIT, ring and busy tones. In yet another example embodiment, the above-mentioned steps may be performed on other types of audio signals. In yet still another example embodiment, the above-mentioned steps may be performed on a recorded audio message.

In 223, the method generates an event as a result of identifying the match by notifying the application of identification of the match. In an example embodiment, if the method determines a match between the stream audio print and known audio print, the method generates an event, such as notifying the application (from which the audio stream was received) of identification of the match. For example, the method may be performed on the audio received after placing a telephone call but before it is answered, which is known as early media or pre-call audio. In this example, the library of known audio prints might comprise carrier voice messages indicating, for example, the fact that the number is disconnected, or that the subscriber is not available. In this scenario, the method reports back if a match is made to one of these carrier voice messages and, if so, to which message, so that the application can properly update records about the number it has dialed.

In another example embodiment, the method notifies the application of the match as well as a number of times the match was made in the audio stream. For example, the method may be performed on a radio program to determine if content (such as a commercial advertisement) was played within the radio program, correctly, the correct number of times, and at correct points in the radio program. In this scenario, the method reports back both the match as well as the number of times the match was made and the temporal points within the radio program at which the match was made. The radio program may be live, or it may be pre-recorded. In another example embodiment, the method may be performed to determine if commercial advertisements were played within television content, or content streamed over the Internet.

In another example embodiment, the method may be used for scripting an interactive voice response application (IVR)

to interact with another IVR by detecting voice prompts, and generating an event that identifies what the next response should be.

Alternatively, in 224, if application of the silence constraint is not successful, the method continues to perform the signal analysis, apply the silence constraint, determine the potential match, and compute the total scoring metric function on a plurality of segments associated with the audio stream, where the audio stream is comprised of the plurality of segments, until at least one of:

i) the potential match is determined, or
ii) the potential match is not determined in any of the plurality of segments.

The method then notifies the application that there is no matching known audio print for the known audio print, or any of the known audio prints in the library of known audio prints. In an example embodiment, the method compares the stream audio print to the known audio print to determine a match at a temporal point in the audio stream. If a match is not determined, the method continues through the audio stream (i.e., other temporal points) until either a match has been determined, or the audio stream has been completely traversed and processed. If no match has been made throughout the entirety of the audio stream for any of the known audio prints, the method notifies the application (from which the audio stream was received) that there was no matching known audio print discovered within the audio stream.

Alternatively, in 225, if application of the silence constraint is not successful, the method identifies the stream audio print as a possible new known audio print to be added to the library of known audio prints. In other words, if the method computes a stream audio print, and determines that there is no match for the stream audio print within the library of known audio prints, then the method may identify that stream audio print as a possible new known audio print that needs to be analyzed and added to the library.

FIG. 8 is a flowchart of an example embodiment for constructing, at the processor, the library of known audio prints by selecting and cropping snippets of audio streams containing audio that the application desires to detect.

In 226, the method constructs, at the processor, the library of known audio prints by creating audio prints from pre-recorded audio streams containing audio that the application desires to detect. This is performed by determining periods of silence where the energy is less than a tunable threshold to create a silence constraint associated with this known audio print. The method then selects temporal points, and determines component data at those points to create the known audio print. The method may also generate a synthetic audio print from a plurality of similar audio streams containing audio that the application desires to detect, where the library of known audio prints comprises audio prints and synthetic audio prints.

Figure 5B:
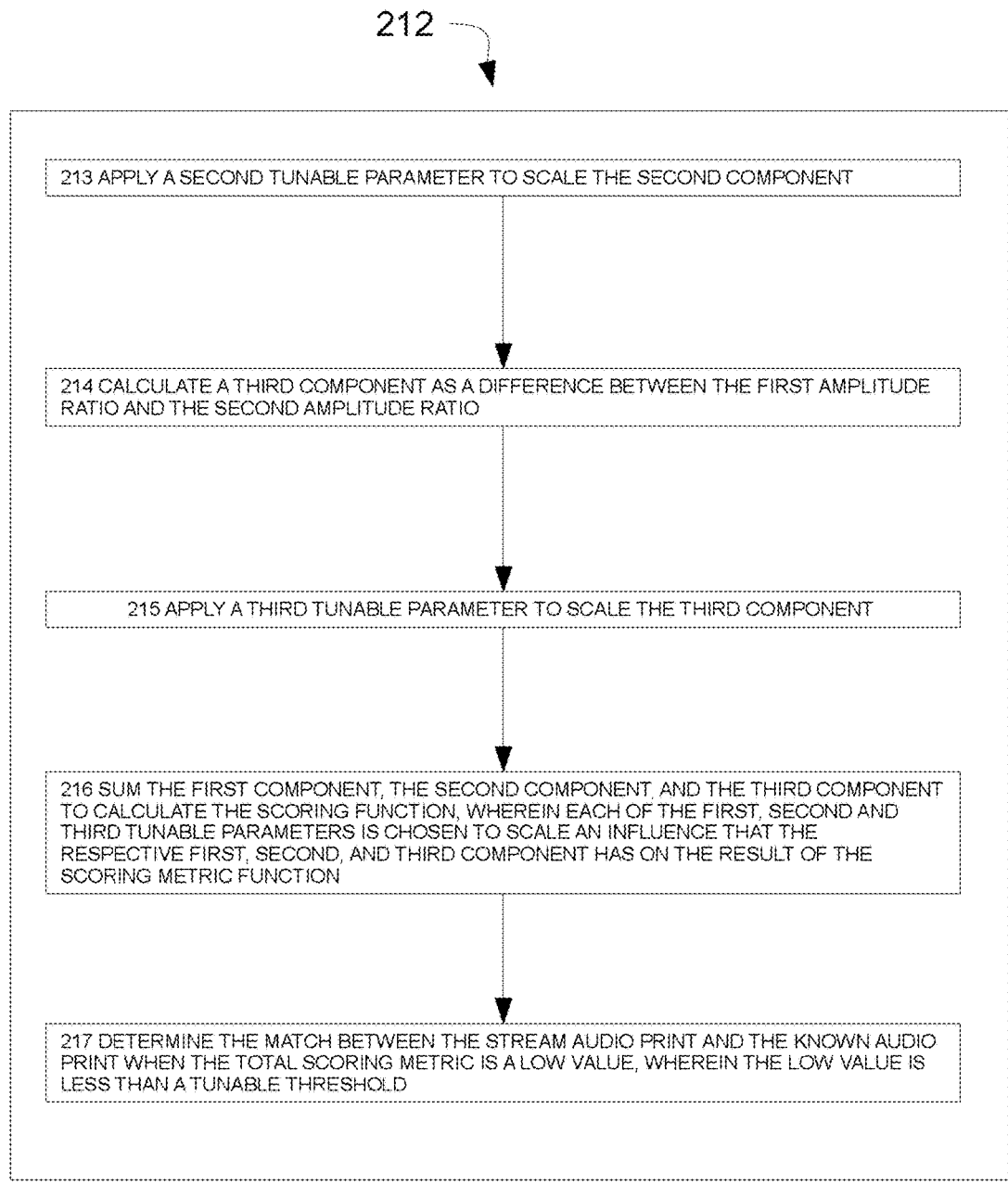
FIG. 5b a continuation of the flowchart of FIG. 5a illustrating an embodiment of a method for matching a digitized stream of audio signals to a known audio recording where the method computes a scoring metric function at a subset of temporal points, according to embodiments disclosed herein.

In an example embodiment, the method constructs, at the processor, the library of known audio prints from pre-recorded audio stream segments provided by the application. The library of known audio prints comprises known audio prints and synthetic audio prints. The known audio print is created by determining periods of silence in the pre-recorded audio stream segments where energy is less than a tunable threshold, to create a silence constraint associated with the known audio print. The method selects temporal points within the known audio print, and determines component data at the temporal points. In an example embodiment, the method determines component data as described above in FIGS. 5a and 5b. The method generates a synthetic audio print from a plurality of similar audio streams from the pre-recorded audio stream segments provided by the application.

In 227, the method generates a synthetic audio print from a plurality of similar audio streams containing audio that the application desires to detect, where the library of known audio prints comprises audio prints and synthetic audio prints. In an example embodiment, the method may determine a similarity between a plurality of audio streams, and generate a synthetic audio print from the plurality of similar audio streams to use as a known audio print in the library of known audio print. In another example embodiment, the generated synthetic audio print is a "better" audio print than a known audio print from the library of known audio prints.

In 228, the method performs the signal analysis on a plurality of similar audio streams to generate a plurality of stream audio prints. In an example embodiment, the method performs the signal analysis on the plurality of audio streams to generate a plurality of stream audio prints to utilize when generating the synthetic audio print. In an example embodiment, the plurality of similar audio streams matches only one known audio print. In another example embodiment, the plurality of similar audio streams match more than one known audio print.

In 229, the method performs a statistical comparison on the plurality of stream audio prints to determine:

i) common periods of silence,
ii) common frequencies among the plurality of stream audio prints, and
iii) frequencies within the plurality of stream audio prints that most often match at least one frequency associated with at least one known audio print.

In an example embodiment, the method performs the statistical comparison on the plurality of stream audio prints to determine the most common frequencies among the plurality of stream audio prints as well as the frequencies that most often match at least one frequency associated with the known audio print or known audio prints in an effort to generate the "better" known audio print.

In 230, the method generates the synthetic audio print from:

i) the common periods of silence,
ii) the common frequencies among the plurality of stream audio prints, and
iii) the frequencies within the plurality of stream audio prints that most often match at least one frequency associated with at least one known audio print.

In an example embodiment, the method uses the common periods of silence to apply the silence constraint, and the common frequencies and the frequencies that most often match the known audio prints as the frequencies used to compute the total scoring metric function. The method uses these frequencies also to compute the amplitude ratio that is used in the total scoring metric function when the scoring metric function is used to determine a match between a stream audio print and a known audio print (i.e., in this case, the known audio print would be the synthetic audio print).

In 231, the method uses the synthetic audio print as the known audio print when determining the potential match, and when computing the total scoring metric function. In other words, the method generates the synthetic audio print, and then uses that synthetic audio print as one of the known audio prints (i.e., a plurality of frequencies and an amplitude ratio between the plurality of frequencies) in the library of known audio prints.

FIG. 9 is a flowchart of an example embodiment for performing signal analysis on the audio stream to compute a stream audio print of the audio stream.

In 232, the method performs signal analysis on the audio stream to compute a stream audio print of the audio stream, where the stream audio print identifies a pattern associated with the audio stream, and where the signal analysis is performed on sound and silence within the audio stream.

In 233, the method determines at least two frequencies within the audio stream where at least two frequencies are selected from a plurality of computed frequencies. In an example embodiment, the method performs the signal analysis on the audio stream using the process explained above in 201. From the frequencies computed, the method selects at least two frequencies. The method selects at least two frequencies because at least two frequencies are required to analyze, for example, call progress dual frequency signals. In an example embodiment, the method selects the most energetic or significant frequencies, for example, at least two of the most energetic frequencies, and their respective amplitudes. The method selects at least two of the most energetic frequencies because these frequencies are least likely to be obscured in the presence of noise. In another example embodiment, the actual amplitudes of the frequencies are not as important as the amplitude ratio between the frequencies.

In 234, the method determines a respective amplitude associated with each of at least two frequencies. As noted above, in an example embodiment, the method selects the frequencies after performing the signal analysis and then determines the amplitudes associated with each of the selected frequencies.

In 235, the method identifies an amplitude ratio between each of the respective amplitudes. In an example embodiment, when the method identifies at least two of the frequencies and determines their respective amplitudes, the method identifies an amplitude ratio between the identified frequencies. In another example embodiment, the preferred ratio is close to "1".

Alternatively, in 236, the method identifies at least one period of silence within the audio stream. The period of silence may be identified when energy is lower than a percentage of a peak amplitude associated with a respective sample of the audio stream. For example, the period of silence may be defined as any period of the signal where the average amplitude is less than, for example, 10% of the peak amplitude for that given sample. In another example embodiment, the percentage is tunable.

FIG. 10 is a flowchart of an example embodiment for applying a silence constraint to match periods of silence in the stream audio print to periods of silence in a known audio print.

In 237, the method applies a silence constraint to match periods of silence in the stream audio print to periods of silence in a known audio print from a library of known audio prints. The silence constraint is associated with the known audio print. In an example embodiment, the method performs a signal analysis on the audio stream, and then applies a silence constraint to the stream audio print before computing the total scoring metric function. The signal analysis is performed on both sound and silence within the audio stream, and then the silence constraint is applied to portions of the stream audio print that are determined to be periods of silence as described, for example, above in 236.

In 238, the method temporally matches at least one silence period between the stream audio print and the known audio print. In an example embodiment, the method matches at least one silence period in the stream audio print to at least one silence period in the known audio print where the silence period in the stream audio print must occur at the same point as the silence period in the known audio print. If the silence period in the stream audio print is not determined to occur at the same point as in the known audio print, then the silence constraint is determined to have failed, and the total scoring metric function is not performed on the stream audio print.

FIG. 11 is a flowchart of an example embodiment for determining a potential match between the stream audio print and the known audio print.

In 239, the method determining a potential match between the stream audio print and the known audio print. In an example embodiment, the method performs signal analysis on an audio stream to compute a stream audio print. The method then applies a silence constraint to the stream audio print to determine if periods of silence in the stream audio print match periods of silence in the known audio print. If application of the silence constraint is successful, then the method determines there is a potential match between the stream audio print and the known audio print, and proceeds to compute the total scoring metric function.

In 240, the method determines the potential match between:
i) at least two frequencies and amplitude ratios associated with the stream audio print, and
ii) at least two frequencies and amplitude ratios associated with the known audio print.

In an example embodiment, the method performs signal analysis on the audio stream to compute the stream audio print. The stream audio print may be computed in a variety of ways. The stream audio print may be comprised of at least two frequencies, and an amplitude ratio of the respective amplitudes associated with the frequencies. The known audio print likewise may be comprised of at least two frequencies and an amplitude ratio of the respective amplitudes associated with the known audio print frequencies. The method may use a variety of ways to determine the potential match, for example, using the equations described in FIG. 4.

FIG. 12 is a flowchart of an example embodiment for receiving the audio stream of an outbound telephone call before the call is answered.

In 241, the method receives, at the processor, an audio stream from an application.

In 242, the method receives the audio stream of an outbound telephone call before the telephone call is answered. In this example, the application may desire to know if there is any information in this audio that can allow the application to more accurately disposition the result of attempted call. In an example embodiment, the audio stream is comprised of at least one of:
i) early media,
ii) pre-call audio of the telephone call, and
iii) ring back audio.

The known audio print from the library of known audio prints comprises a library of pre-recorded messages representing messages played by at least one of:
i) a telecommunication carrier,
ii) a phone company,
iii) a mobile phone company, and
iv) a ring back tone provider.

For example, the message might be played by the terminating telephone company and might comprise voice audio data saying, "The number you have reached has been disconnected". Or, the message might be played by a mobile phone company and might say, "The subscriber you are trying to reach is temporarily not available, please try your call again later". These example messages may be part of a library of known audio prints that the application wishes to detect. The pre-recorded messages comprise at least one of:
i) voice audio,
ii) a period of silence,
iii) a special information tone, and
iv) a ring tone.

FIG. 12 is a flowchart of an example embodiment for receiving the audio stream of an outbound telephone call immediately after the call is answered.

In 243, the method receives, at the processor, an audio stream from an application.

In 244, the method receives the audio stream of an outbound telephone call immediately after the telephone call is answered. In this example, the application may wish to know if an answering machine or voicemail system or IVR system has answered the call, in which case it may take different action than if the called party answers the phone. The known audio print from the library of known audio prints comprises a library of pre-recorded messages representing messages played by at least one of:
i) an answering machine,
ii) a voicemail system, and
iii) an IVR system.

The pre-recorded messages comprise at least one of:
i) a default message played by the answering machine if a person receiving the telephone call has not recorded their own greeting,
ii) the voicemail system used by a Private Branch Exchange (PBX) system,
iii) the voicemail system used by an Automatic Call Distributor (ACD) system,
iv) the voicemail system used by a mobile carrier,
v) the voicemail system used by a telephone company,
vi) an IVR system,
vii) another type of automated answering message played when the person receiving the telephone call does not answer in person, and
viii) a beep or tone played by the answering machine or the voicemail system indicating that a caller is to record a message.

For example, the message might be played by a commercial home answering machine if the homeowner has not recorded a custom greeting. The message may recite, "We can not take your call right now". In another example, the message may be from an automated voicemail system used by a mobile phone company if the called party (i.e., the person receiving the phone call) doesn't answer the phone. In this scenario, the message may recite, "The person you have called can not answer the phone, please leave a message". These example messages may be part of a library of known audio prints that the application wishes to detect.

In 245, the method receives, at the processor, an audio stream from an application.

In 246, the method receives the audio stream of an outbound telephone call after the telephone call is answered. In this example, the application may be placing a call to a remote Interactive Voice Response (IVR) system, and may wish to automatically navigate a set of menus to obtain some data. The known audio print from the library of known audio prints comprises a library of pre-recorded messages representing messages played by an interactive voice response (IVR) system. The pre-recorded messages comprise at least one of:

i) voice prompts played by the IVR; and
ii) tones played by the IVR.

For example, the pre-recorded messages might correspond to different voice prompts played by the IVR, e.g. "Hello, you have reached the First Bank of Example Town", and "To check your account balance, press 1", The application may, by a combination of using the method to detect menu prompts, and then by playing DTMF tones, navigate through the IVR menus. Further pre-recorded messages in the known audio print library could include simple pre-recorded numbers such as, "one", "two", "three", . . . "ten", "hundred", and other short phrases such as "dollars", and "cents". With such pre-recorded messages in the known audio print library, the method may supply the application with details about which messages were matched so that the application could understand the account balance.

In an example embodiment, when the method performs the signal analysis on each of the plurality of portions, the method identifies a most recent portion from the plurality of portions, and identifies at least one less recent portion from the plurality of portions. The method performs the signal analysis on the most recent portion and data associated with at least one less recent portion to determine at least one of a sound event, silence event, a tone event, and a DTMF event. The data associated with at least one less recent portion comprises signal analysis data and events associated with at least one less recent portion. For example, the method may need to make a rapid determination (i.e., within seconds) as to whether the phone has been answered by a human or by an answering machine. In this scenario, the method has several detectors that analyze, in real-time, the called party's audio stream. The called party's audio stream is broken into, for example, 20 millisecond chunks (different sized chunks may also be used). Each detector analyzes the most recent 20 millisecond chunk along with interim data from some number of prior chunks to make a determination as to whether a particular event is occurring. The detectors may include silence, energy, tone and DTMF. The method may determine if the audio stream is currently silent. The method may determine if the audio stream is currently exhibiting frequency spectrum that has audio energy (i.e., the opposite of silence). The method may determine if a tone or beep is being played, as well as the frequency of the tone. The method may determine if a special two-frequency tone (DTMF) is being played.

In an example embodiment, when the method performs the signal analysis on each of the plurality of portions, the method generates a real time sequence indicating at each sequence point whether a sound event, silence event, tone event, or DTMF event occurs. In other words, for each audio stream, the method generates in real-time a sequence of N-tuples indicating at what point in time the different events (i.e., a sound event, silence event, tone event, or DTMF event) were detected.

In an example embodiment, when the method generates the real time sequence, the method examines the sequence with the heuristic engine to detect the pattern indicating at least one of an automated device answering the phone call, and the human answering the phone call. In other words, a heuristic engine with tunable parameters may examine the N-tuple stream to find patterns that the heuristic engine determines are definitely either a human or an answering machine. For example, a pattern in which ½ second of voice is detected followed by silence is likely a human answering the phone saying, "Hello", and then waiting for the other side to respond. In this scenario, the heuristic engine would, after a short amount of silence had elapsed, indicate that the call was answered by a human. Alternatively, a call that starts with a short period of silence, and then proceeds with voice energy that continues on for 10 to 15 seconds is most likely a call that has been answered by an answering machine. The heuristic engine would, at some point, determine that this was an answering machine. When the method, via the heuristic engine, detects a tone detector, the method determines the call is answering machine because a human voice would generally not generate a tone. The detection of a tone most likely indicates that an answering machine has delivered the greeting, and then finished the greeting by playing a "beep" to indicate that the caller may leave a message. Generally, tones or beeps delivered by answering machines have more constrained characteristics than human speech. The method excludes some tones that are broader and that might occur in human speech so as not to incorrectly determine that a human voice is a tone generated by an answering machine. When the method, via the heuristic engine, detects a DTMF event, the method determines that a human has answered the phone. A DTMF is a special dual-frequency tone that is generated by a telephone dial pad when a called party presses a key. Therefore, detection of a DTMF event indicates a human has pressed a key on the dial pad.

In an example embodiment, when the method examines the sequence with the heuristic engine, the method tunes the heuristic engine to accurately determine at least one of the automated device answering a phone call, and the human answering the phone call. The parameters of the heuristic engine need to be tuned to maintain a balance between the need for a quick determination for the call (i.e., human or answering machine), and an accurate determination. For example, if a human answers the call, and they hear a long period of silence (before the method determines that a human has answered the call, and transfers that human to a live agent) the human is likely to hang up (and be annoyed by the call). On the other hand, if the method too quickly (and incorrectly) determines that phone calls have been answered by human (and transfers them to a live agent), the incorrect transfer will end up wasting the live agent's time and eventually reduce the overall efficiency of the call center. Therefore, the tunable parameters must balance accurate results against rapid processing of the answered calls.

In an example embodiment, upon detecting the human answering the phone call, the method performs at least one of: i) transferring the call to a human agent to respond to the human answering the phone call, ii) playing a pre-recorded message, iii) playing an interactive voice response script, and iv) notifying the calling application that a human has answered the call.

In an example embodiment, upon detecting an automated device answering the phone call, the method performs at least one of i) terminating the call, ii) playing a pre-recorded message, iii) playing a sequence of pre-recorded messages to the automated device, and iv) notifying the application that an automated device has answered the call.

In an example embodiment, when the known audio print library is comprised of a plurality of audio prints of known automated devices, upon detecting a known automated device audio print, the method performs at least one of i) terminating the call, ii) awaiting a tone and playing at least one of a sequence of pre-recorded messages to the automated device, and iii) notifying the application that an automated device has answered the call. For example, the method may, using a voiceprint detector, detect a known answering machine response such as the standard greeting that a wireless carrier may provide for all wireless customers. When the method matches a called party's response with a known automated device audio print, the method determines that an answering machine has answered the call.

In an example embodiment, upon detecting the automated device answering the phone call, the method determines the stream audio print is associated with an automated device answering the phone call, and identifies the stream audio print as a possible new known audio print to be added to the library of known audio prints. For example, the voiceprint detector may determine that an answering machine has answered the call, and that the answering machine's greeting is not in the library of known audio prints. In this scenario, the method identifies the answering machine's greeting as a potential new known audio print to be added to the library of known audio prints.

In an example embodiment, when the method tunes the heuristic engine to accurately determine at least one of the automated device answering a phone call, and the human answering the phone call, the method analyzes a timing associated with at least one of the sound and the silence to accurately determine at least one of the automated device answering a phone call, and the human answering the phone call. As noted above, the tunable parameters must balance accurate results against rapid processing of the answered calls In an example embodiment, when the method performs the signal analysis on the most recent portion and the data associated with at least one less recent portion, the method detects the tone in the most recent portion, and determines that an automated device has answered the call. As noted above, the detection of a tone most likely indicates that an answering machine has delivered the greeting, and then finished the greeting by playing a "beep" to indicate that the caller may leave a message.

In an example embodiment, when the method performs the signal analysis on the most recent portion and data associated with at least one less recent portion, the method detects the DTMF in the most recent portion, and determines that a live human has answered the call. As noted above, a DTMF is a special dual-frequency tone that is generated by a telephone dial pad when a called party presses a key. Therefore, detection of a DTMF event indicates a human has pressed a key on the dial pad In an example embodiment, upon receiving a silence event, the method plays at least one of the pre-recorded message and the interactive voice response script. For example, an application that places the call may want to play a pre-recorded message or invoke an IVR script to the caller immediately after the phone is answered. Upon receiving the sound event during the playing of the pre-recorded message or the interactive voice response script, the method ceases at least one of the pre-recorded message and the interactive voice response script where the sound event is at least one of the automated device answering the phone call and the human answering the phone call. For example, when the method detects that the phone has been answered, the method may assume that a human has answered the call. The method may begin to play a pre-recorded message or begin an IVR script once the audio energy ceases (i.e., after the human says, "Hello"). During this time the method continues to perform the detection algorithm using the heuristic engine with the different tunable parameters to determine whether the call has been answered by a human or by an answering machine. This provides the method with additional time in which to more accurately assess whether the call has been answered by a human or by an answering machine. The method will continue to perform the detection until one of the following situations occur:

- A tone detector event is detected. In this scenario, the method speculates that a "beep" was detected, and the method presumes that the call was answered by an answering machine.
- A DTMF event is detected. In this scenario, this is a definitive indication that a human has pressed a key on the dial pad as it is not possible for the human voice to generate a dual tone signal.
- The call terminates on the remote side. The method presumes that a human answered the phone, and hung up.
- The pre-recorded message or IVR script finished, and the method hangs up the call, never having detected a tone or DTMF event. In this scenario, the method presumes a human answered the phone and listened to the message.

In an example embodiment, until the method determines whether an answering machine or a human answered the phone call, the method performs the steps of i) playing at least one of the pre-recorded message and the interactive voice response script and ii) ceasing at least one of the pre-recorded message and the interactive voice response script. When the call is answered, the method has not yet determined whether a human or an answering machine has answered the call. More specifically, the method does not know whether a human will answer, say "Hello", and then listen to the message, or whether an answering machine will answer, play a greeting, and then "beep". If the method determines audio energy (i.e., sound) is detected followed by a short period of silence, the method begins to play the pre-recorded message or IVR script. If, after starting the pre-recorded message or IVR script, the method detects more audio energy, the method stops playing the pre-recorded message or IVR script while the audio energy continues (i.e., the other person is talking). The method then waits for silence, and upon detecting silence, the method begins to play the pre-recorded message or IVR script from the beginning. Thus, if a human answers the phone, they will hear the pre-recorded message or IVR script. If the method detects a tone, the method determines that an answering machine has answered the call. The method then either restarts the pre-recorded message or IVR script, or hangs up the call.

In an example embodiment, when the method examines the sequence with the heuristic engine, the method tunes the heuristic engine to return a result within a predetermined period of time. The method may also tune the heuristic engine to return the result regardless of the predetermined period of time, where the heuristic engine determines the automated device answering the phone call or the human answering the phone call.

In an example embodiment, when the method performs the signal analysis on each of the plurality of portions, the method determines the frequency associated with the tone detected in a portion. The method then weights the tone, based on the frequency, to determine at least one of the automated device answering the phone call, and the human answering the phone call.

In an example embodiment, when the method determines the frequency associated with a tone detected in a portion, the method detects that the frequency exceeds a threshold associated with a human voice, and determines the automated device is answering the phone call based on the frequency.

In an example embodiment, when the method weights the tone, the method establishes a probability associated with the frequency, where the probability that the frequency is associated with the automated device answering the phone call diminishes as the frequency is identified as a lower frequency than a higher frequency, and where the probability that the frequency is associated with the automated device answering the phone call increases as the frequency is identified as the higher frequency. In other words, the lower the frequency, the more likely the call was not answered by an answering machine. The higher the frequency, the more likely the call was answered by an answering machine.

In an example embodiment, when the method determines the frequency associated with the tone detected in a portion, the method identifies a highest value frequency in the portion, and identifies the tone associated with the highest value frequency in the portion as a dominant tone in the portion.

In an example embodiment, when the method identifies the highest value frequency in the portion, the method tracks a plurality of tones in the portion. The method eliminates any tones that drop out in the portion, and identifies the highest value frequency from the remaining tones in the portion.

In an example embodiment, when the method identifies the tone associated with the highest value frequency in the portion as a dominant tone in the portion, the method tracks a plurality of frequencies in the portion. The method identifies the highest frequency as being a predetermined percentage higher than a next highest frequency, and then identifies the tone associated with the highest frequency as the only dominant tone in the portion.

In an example method for determining whether a phone call is answered by an automated device or a human, the method receives, at the processor 106, an audio stream from an application, for example, a telephony system. The automated device may be, for example, an answering machine and/or an Interactive Voice Response (IVR) system. The audio stream may represent the audio after a phone call is answered. The audio stream may also be a recorded telephony message from an Interactive Voice Response (IVR) system, Private Branch Exchange (PBX), answering machine, Automatic Call Distributor (ACD), other automated telephone messaging systems, or a human answering the phone. The audio stream may also be received via the Internet. The audio stream may also be received from a microphone of a smart phone as part of an application.

The method performs, at the processor 106, signal analysis on the audio stream to compute a sequence of events in the audio stream. In an example embodiment, the method may perform the analysis by computing various attributes of the audio, and/or by using a heuristic engine. The method may also compare the audio steam to known audio (for example, recorded automated responses) used by automated devices. If a telephony system is playing an Interactive Voice Response (IVR) script to the outbound call, the application can utilize additional time and attributes of the audio to perform a more accurate analysis. The audio stream is comprised of sound and silence, and the sequence of events is computed on sound and silence. The sequence of events identifies a pattern associated with the audio stream. The pattern is comprised of at least two of sound, silence, frequency, magnitude, duration, tone, and Dual Tone Multi Frequency (DTMF). The pattern matches a similar pattern of at least two of sound, silence, frequency, magnitude, duration, tone, and DTMF. The pattern indicates an automated device answering a phone call, and/or a human answering the phone call. The similar pattern is associated with an automated device answering the phone call and/or a human answering the phone call. The signal analysis is performed on sound and silence within the audio stream. The signal analysis may be performed using a variety of methods. In an example embodiment, given an audio stream (i.e., a digital audio signal):

$$x(ti), i=0, \ldots, \infty$$

The audio stream is sampled at a rate of N samples per second. Then, a discrete Fourier transform (DFT) is computed of overlapped, windowed segments of the audio signal of length M, overlapped by length L, with frequencies grouped into frequency buckets or ranges of size B. In an example embodiment, a Hamming window may be used, but any number of other windows may be chosen. The DFT produces a spectrogram (i.e., the frequency response 114), with frequency bucket and amplitude components of the signal at discrete points in time. The choice of B, M and L is tunable, and may impact the calculation results. For example, given an audio stream, sampled at N=8000 samples per second, selection of a window length M=800 will produce a frequency resolution of N/M, or 10 Hz, when the DFT is computed. Selection of L=160 samples, results in the temporal resolution of 160/8000, or 0.02 seconds. Selection of bucket sizes of 100 Hz will cause the DFT to output the energy in the given frequency ranges, e.g. between 400 and 500 Hz for the $4^{th}$ bucket.

The method determines, at the processor 106, whether the sequence of events indicates the phone call is answered by the automated device or the human, based on at least one of i) rules in a heuristic engine, and ii) a known audio print from a library of known audio prints. In an example embodiment, the signal analysis is computed on voice and silence portions of the audio stream representing the answered phone call. Computation of the signal analysis produces the sequence of events that are then provided as inputs to the heuristic engine. In an example embodiment, the heuristic engine applies a tunable silence constraint to determine that the entity answering a phone call has completed an utterance. In an example embodiment, the method applies a plurality of constraints and thresholds (for example, a silence constraint, tone magnitude, tone noise factor, tone minimum frequency, tone maximum frequency, silence threshold, portion non-silence percentage, maximum initial silence, maximum greeting, tone portion percent, low frequency start frequency, frequency drift, tone magnitude range, gaps permitted in tone, etc.). After applying the plurality of constraints and thresholds, the method then determines, at the processor 106, a potential match between the sequence of events and the rules in the heuristic engine. In an example embodiment, the pattern matches a similar pattern of at least two of sound, silence, frequency, magnitude, duration, tone, and DTMF in the heuristic engine.

In an example embodiment, when the method performs signal analysis on the audio stream to compute the sequence of events in the audio stream, the method receives the audio stream real time as the phone call is answered. In other words, the method performs the signal analysis as the phone call is received, instead of storing the audio stream and performing the signal analysis on the stored audio stream. The method partitions the audio stream into a plurality of portions as the audio stream is received, and performs the signal analysis on each of the plurality of portions.

In an example embodiment, when the method performs the signal analysis on each of the plurality of portions, the method identifies a most recent portion from the plurality of portions, and also identifies at least one less recent portion from the plurality of portions. In other words, as the method receives the audio stream real time as the phone call is received, the method identifies the most recent portion (i.e., the "last" received portion) of received audio stream, and the second to last received portion (or third to last, or fourth to last, etc.) of the received audio stream. The method then performs the signal analysis on the most recent portion and data associated with the less recent portion to determine at least one of a sound event, silence event, a tone event, a DTMF event, an automated device answering the phone call event, and a human answering the phone call event, where the data associated with the less recent portion comprises signal analysis data and events associated with the less recent portion.

Figure 15:
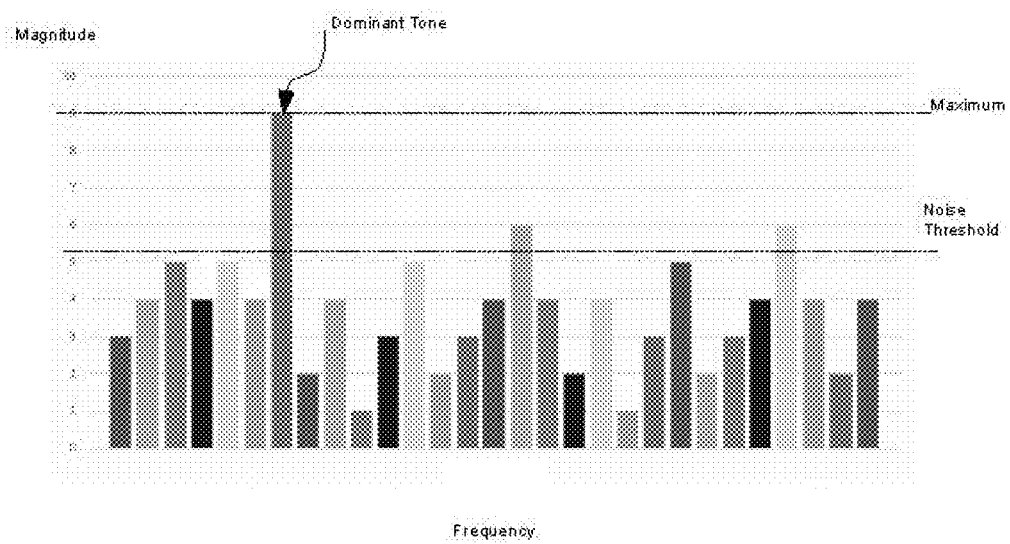
FIG. 15 is an example chart illustrating a dominant tone, according to embodiments disclosed herein.
Figure 16:
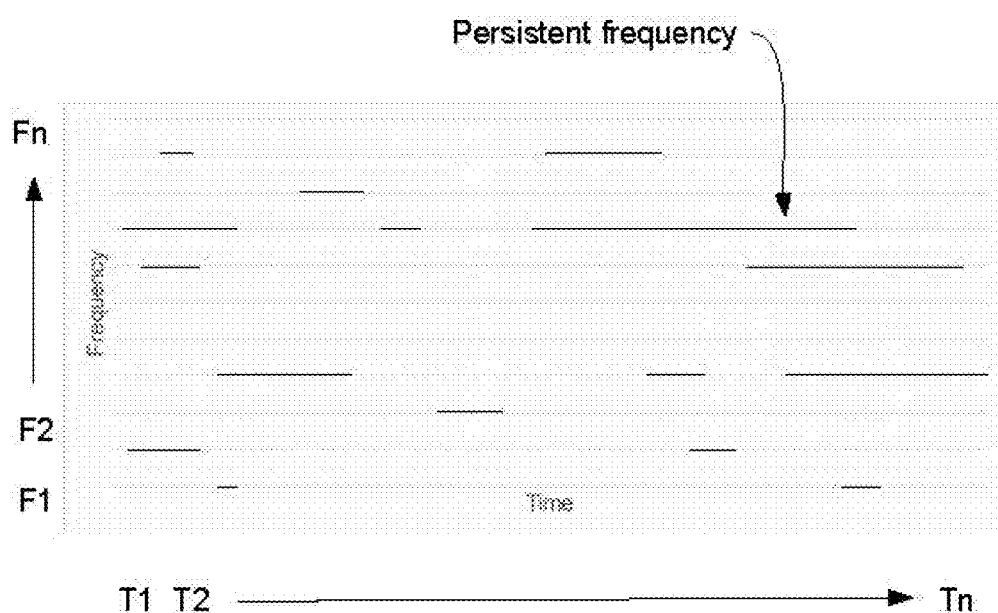
FIG. 16 is an example chart illustrating persistent frequencies, according to embodiments disclosed herein.

In an example embodiment, when the method performs the signal analysis on each of the plurality of portions and data associated with the less recent portion, the method calculates, from the most recent portion and data associated with the less recent portion, values comprising at least one of duration of an entire stream, average magnitude of the portion, maximum magnitude of the portion, noise threshold, frequencies seen in the portion, duration of persistent frequencies, frequency of current dominant tone, duration of current dominant tone, overall duration of all silence portions, and duration of most recent silence portion. The method generates a real time sequence indicating at each sequence point whether at least one of the sound event, silence event, tone event, DTMF, automated device answering the phone call event, and human answering the phone call event occurs. In an example embodiment:

a. The duration of the Entire Stream represents the number of portions since the phone call was answered and analysis was begun. The duration of entire stream for portion $P_n$ when the portion size is M=n*M.

b. The average magnitude of the portion is calculated by determining the average amplitude of the audio waveform in the portion.

c. The maximum magnitude is the highest amplitude of the audio waveform in in the portion.

d. The Noise Threshold is the difference between the maximum magnitude and the average threshold, and is used to determine if a frequency is seen in the portion.

e. The silence portions are defined as those in which the overall sound amplitude is less than a tunable threshold. In an example embodiment, the method measures the total number of portions which are lower than the threshold during the most recent period of silence, as well as the total number of such portions overall in the stream audio print.

f. The frequencies seen in the portion are those which exceed the noise threshold by more than a configurable amount.

g. The persistent frequencies are those which are seen in the portion and have persisted for one or more additional portions as illustrated in FIG. 16. In the example embodiment, the length of the one or more longest persistent frequencies is tracked.

h. A dominant tone in a portion occurs when a strongest frequency has a higher magnitude than the magnitude of the next strongest frequency by more than a tunable amount as illustrated in FIG. 15. When a dominant tone occurs, the example embodiment calculates the frequency of the dominant tone as well as the number of portions that the same frequency has been a dominant tone.

In an example embodiment, when the method generates the real time sequence, the method examines the values with the heuristic engine to detect the pattern indicating at least one of the sound event, silence event, tone event, DTMF, automated device answering the phone call event, and human answering the phone call event.

In an example embodiment, when the method examines the values with the heuristic engine, the method utilizes at least one of a threshold, constraints, and parameters to examine the values calculated. The threshold, constraints, and parameters are comprised of at least one of tone magnitude threshold, tone noise factor, tone minimum frequency, tone maximum frequency, silence threshold, portion non-silence percent, maximum initial silence, maximum greeting, tone portion percent, low frequency start index, frequency drift, tone maximum range, and gap portions permitted in the tone to calculate a weighted likelihood that at least one of the sound event, silence event, tone event, DTMF, an automated device answering the phone call event, and a human answering the phone call event has occurred. In an example embodiment, a. The tone magnitude threshold represents the minimum amplitude that a frequency must exhibit in order to be considered to have been a frequency seen in a portion.
b. The tone noise factor represents a tunable parameter to adjust the noise threshold.
c. The tone minimum frequency represents the minimum frequency that can generate a tone event.
d. The tone maximum frequency represents the maximum frequency that can generate a tone event.
e. The silence threshold represents the audio amplitude below which a waveform is considered to be silence.
f. The portion non-silence percent represents the maximum percentage of time during a portion that the audio waveform can exceed the silence threshold and still be considered to be a silence portion.
g. The maximum initial silence is the maximum number of portions that can be considered to be silent at the beginning of analysis in order to generate a human event.
h. The maximum greeting is the maximum number of sound portions after initial silence in order for the audio to generate a human event.
i. The tone portion percent is the amount of time during a portion that a tone needs to be present in order to be considered to be seen within a portion.
j. The low frequency start frequency is the beginning value at which a tone is considered a low frequency.
k. The frequency drift is the amount that a persistent frequency can drift from portion to portion and still be considered the same frequency.
l. The tone magnitude range is the amount by which the magnitude of a persistent frequency can change and still be considered the same persistent frequency.
m. The gaps permitted in tone represent the maximum number of portions in which a frequency does not meet the dominance criteria yet still can be considered to be a dominant tone. For example, if 1400 hertz is dominant for 10 portions, then not dominant for 2, then dominant again for 15 at $P_n$, and if the gap permitted in tone threshold is tuned to 5 portions, the 1400 hertz would be considered dominant for 27 portions at $P_n$ (i.e., 10 portions+2 portions+15 portions=27 portions).

The above list represents at least some of the plurality of constraints and thresholds that the method applies.

The method tunes the threshold, constraints and parameters to accurately determine at least one of the sound event, silence event, tone event, DTMF, the automated device answering the phone call event, and the human answering the phone call event. Upon detecting that the human answered the phone call, the method performs at least one of i) transferring the call to a human agent to respond to the human answering the phone call, ii) playing a pre-recorded message, iii) playing an interactive voice response script, and iv) notifying the calling application that a human has answered the call. Upon detecting that the automated device answered the phone call, the method performs at least one of i) terminating the call, ii) playing a pre-recorded message, iii) playing a sequence of pre-recorded messages to the automated device, and iv) notifying the application that an automated device has answered the call.

In an example embodiment, when the method performs, at the processor, signal analysis on the audio stream to computer the sequence of events in the audio stream, the method receives the audio stream real time as the phone call is answered. When the duration of the audio stream exceeds the duration of the known audio print by a multiple of a tunable interval, the method determines the potential match between the stream audio print and the known audio print. The known audio print library is comprised of the plurality of audio prints of known automated devices. Upon detecting the known automated device audio print, the method performs at least one of i) terminating the phone call, ii) awaiting the tone and playing at least one of a sequence of pre-recorded messages to the automated device, and iii) notifying the application that the automated device has answered the phone call. Upon detecting the automated device answering the phone call, the method determines the sequence of events is associated with the automated device answering the phone call, and identifies the sequence of events as a possible new known audio print to be added to the library of known audio prints.

In an example embodiment, when the method tunes the heuristic engine to accurately determine at least one of the sound event, silence event, tone event, DTMF, the automated device answering the phone call event, and the human answering the phone call event, the method performs the signal analysis on a plurality of call recordings with known data for each of the plurality of call recordings. The known data comprises at least one of timing and occurrence of at least one of sound event, silence event, tone event, DTMF events, automated device answering the phone call event, and human answering the phone call event. The method compares the heuristic engine output to the known data. The method also adjusts the heuristic engine tunable parameters to improve accuracy. The method then repeats the steps of performing the signal analysis on the plurality of call recordings, comparing the heuristic engine and adjusting the heuristic engine to obtain a high accuracy rate on the plurality of call recordings.

In an example embodiment, when the method performs the signal analysis on the most recent portion and data associated with the less recent portion, the method detects the tone in the most recent portion, and determines that an automated device has answered the call.

In an example embodiment, when the method performs the signal analysis on the most recent portion and data associated with the less recent portion, the method detects the DTMF in the most recent portion, and determines that a live human has answered the call. Upon receiving the silence event, the method plays at least one of the pre-recorded message and the interactive voice response script. Upon receiving the sound event during the playing of the pre-recorded message or the interactive voice response script, the method ceases at least one of the pre-recorded message and the interactive voice response script. The sound event is at least one of the automated device answering the phone call and the human answering the phone call. Until the method determines whether the automated device or the human is answering the phone call, the method performs the steps of i) playing at least one of the pre-recorded message and the interactive voice response script and ii) ceasing at least one of the pre-recorded message and the interactive voice response script.

In an example embodiment, when the method examines the sequence with the heuristic engine, the method tunes the heuristic engine to return a result within a limited period of time, and/or tunes the heuristic engine to return the result regardless of a limitation on time, where the heuristic engine determines whether the automated device or the human is answering the phone call.

In an example embodiment, when the method performs the signal analysis on each of the plurality of portions, the method determines the frequency associated with the tone detected in a portion. The method weights the tone, based on the frequency, to determine if the tone comprises at least one of the tone event and the automated device answering the call event.

In an example embodiment, when the method determines the frequency associated with a tone detected in a portion, the method detects that the frequency is within a threshold associated with automated devices. The method then determines that an automated device is answering the phone call based on the frequency.

In an example embodiment, when the method weights the tones, the method establishes a probability associated with the frequency, where the probability that the frequency is associated with an automated device answering the phone call diminishes as the frequency is identified as a lower frequency versus a higher frequency, and where the probability that the frequency is associated with the automated device answering the phone call increases as the frequency is identified as the higher frequency.

In an example embodiment, when the method determines the frequency associated with the tone detected in a portion, the method identifies a strongest frequency in the portion, and identifies the tone associated with the strongest frequency in the portion as a dominant tone in the portion.

In an example embodiment, when the method identifies the strongest frequency in the portion, the method tracks a plurality of tones in the portion. The method eliminates any tones that drop out in the portion, and identifies the strongest frequency from the remaining tones in the portion.

In an example embodiment, when the method identifies the tone associated with the strongest frequency in the portion as the dominant tone in the portion, the method tracks a plurality of frequencies in the portion. The method identifies the strongest frequency as being a tunable predetermined percentage stronger than the next strongest frequency. The method then identifies the tone associated with the strongest frequency as the dominant tone in the portion.

A method and system for matching a digitized stream of audio signals to a known audio recording have been disclosed.

A method and system for determining whether a phone call is answered by an automated device or a human have been disclosed.

Although embodiments disclosed herein have been described in accordance with the embodiments shown, one of ordinary skill in the art will readily recognize that there could be variations to the embodiments and those variations would be within the spirit and scope of embodiments disclosed herein. Accordingly, many modifications may be made by one of ordinary skill in the art without departing from the spirit and scope of the appended claims.

What is claimed is:

1. A method of determining whether a phone call is answered by an automated device or a human, the method comprising:
   (a) receiving, at a processor, an audio stream from an application;
   (b) performing, at the processor, signal analysis on the audio stream to compute a sequence of events in the audio stream, wherein the audio stream is comprised of sound and, silence, wherein the sequence of events is computed on the sound and silence, wherein the sequence of events identifies a pattern associated with the audio stream, wherein the pattern is comprised of at least two of sound, silence, frequency, magnitude, duration, tone, and Dual Tone Multi Frequency (DTMF);
   (c) determining, at the processor, whether the phone call is answered by the automated device by using a library of known audio prints used by known automated devices and by using a heuristic engine comprising a plurality of rules,
   wherein in using the library of known audio prints used by the known automated devices, the determining comprises:
      (c1) determining, at the processor, that the pattern matches a similar pattern of at least two of sound, silence, frequency, magnitude, duration, tone, and DTMF in a known audio print in the library of known audio prints;
      (c2) applying, at the processor, a silence constraint to match periods of silence in the sequence of events in the audio stream to periods of silence in the known audio print,
   wherein the silence constraint is associated with the known audio print; and
      (c3) based on the matching of the pattern to the similar pattern and on the application of the silence constraint, determining, at the processor, whether there is a first potential match between the sequence of events in the audio stream and the known audio print; wherein in using the heuristic engine, the determining comprises:
      (c4) providing, at the processor, the sequence of events as input to the heuristic engine;
      (c5) applying, at the processor, the plurality of rules in the heuristic engine to the sequence of events; and
      (c6) based on the application of the plurality of rules, determining, at the processor, whether there is a second potential match between the sequence of events and the plurality of rules in the heuristic engine;
   (d) in response to there being either the first potential match or the second potential match, determining, at the processor, that the phone call is answered by the automated device; and
   (e) in response to there being neither the first potential match nor the second potential match, determining, at the processor, that the phone call is answered by human.

2. The method of claim 1 wherein performing, at the processor, signal analysis on the audio stream to compute the sequence of events in the audio stream comprises:
   receiving the audio stream real time as the phone call is answered;

partitioning the audio stream into a plurality of portions as the audio stream is received; and performing the signal analysis on each of the plurality of portions.

3. The method of claim 2 wherein performing the signal analysis on each of the plurality of portions comprises:

identifying a most recent portion from the plurality of portions;

identifying at least one less recent portion from the plurality of portions; and performing the signal analysis on the most recent portion and data associated with the at least one less recent portion to determine at least one of a sound event, a silence event, a tone event, a DTMF event, an event for the automated device answering the phone call, and an event for the human answering the phone call, wherein the data associated with the at least one less recent portion comprises signal analysis data and events associated with the at least one less recent portion.

4. The method of claim 3 wherein performing the signal analysis on each of the plurality of portions and data associated with the at least one less recent portion comprises:

calculating, from the most recent portion and data associated with the at least one less recent portion, values comprising at least one of duration of an entire stream, average magnitude of the portion, a maximum magnitude of the portion, a noise threshold, frequencies seen in the portion, a duration of persistent frequencies, a frequency of current dominant tone, a duration of current dominant tone, an overall duration of all silence portions, and a duration of most recent silence portion; and generating a real time sequence indicating at each sequence point whether at least one of the sound event, the silence event, the tone event, the DTMF event, the event for the automated device answering the phone call, and the event for the human answering the phone call occurs.

5. The method of claim 4 wherein generating the real time sequence comprises:

examining the values with the heuristic engine to detect a pattern indicating at least one of the sound event, the silence event, the tone event, the DTMF event, the event for the automated device answering the phone call, and the event for the human answering the phone call.

6. The method of claim 5 wherein examining the values with the heuristic engine comprises:

utilizing at least one of a threshold, constraints, and parameters to examine the values calculated, wherein the threshold, constraints, and parameters are comprised of at least one of a tone magnitude threshold, a tone noise factor, a tone minimum frequency, a tone maximum frequency, a silence threshold, portion non-silence percent, a maximum initial silence, a maximum greeting, a tone portion percent, a low frequency start index, a frequency drift, a tone maximum range, and a gap portions permitted in a tone to calculate a weighted likelihood that at least one of the sound event, the silence event, the tone event, the DTMF event, the event for the automated device answering the phone call, and the event for the human answering the phone call has occurred; and tuning the threshold, constraints and parameters to accurately determine at least one of the sound event, the silence event, the tone event, the DTMF event, the event for the automated device answering the phone call, and the event for the human answering the phone call.

7. The method of claim 6 further comprising:

upon detecting the human answering the phone call, performing at least one of:

i) transferring the phone call to a human agent to respond to the human answering the phone call;

ii) playing a pre-recorded message;

iii) playing an interactive voice response script; and iv) notifying a calling application that the human has answered the phone call.

8. The method of claim 6 further comprising:

upon detecting the automated device answering the phone call, performing at least one of:

i) terminating the phone call;

ii) playing a pre-recorded message;

iii) playing a sequence of pre-recorded messages to the automated device; and iv) notifying an application that the automated device has answered the phone call.

9. The method of claim 6 further comprising:

upon determining that the automated device answering the phone call based on the second potential match, identifying the sequence of events as a possible new known audio print to be added to the library of known audio prints.

10. The method of claim 6 wherein tuning the heuristic engine to accurately determine at least one of the sound event, the silence event, the tone event, the DTMF event, the event for the automated device answering the phone call, and the event for the human answering the phone call comprises:

performing the signal analysis on a plurality of call recordings with known data for each of the plurality of call recordings, wherein the known data comprises at least one of a timing and an occurrence of at least one of the sound event, the silence event, the tone event, the DTMF event, the event for the automated device answering the phone call, and the event for the human answering the phone call;

comparing an heuristic engine output to the known data;

adjusting heuristic engine tunable parameters to improve accuracy; and repeating the performing of the signal analysis on the plurality of call recordings, the comparing of the heuristic engine output, and the adjusting of the heuristic engine tunable parameters to obtain a high accuracy rate on the plurality of call recordings.

11. The method of claim 6 wherein examining the values with the heuristic engine comprises at least one of:

tuning the heuristic engine to return a result within a limited period of time; and tuning the heuristic engine to return the result regardless of a limitation on time, wherein the heuristic engine determines the automated device answering the phone call or the human answering the phone call.

12. The method of claim 4 further comprising:

upon receiving the silence event, playing at least one of a pre-recorded message and an interactive voice response script; and upon receiving the sound event during the playing of the pre-recorded message or the interactive voice response script, ceasing at least one of the pre-recorded message and the interactive voice response script wherein the sound event is at least one of the automated device answering the phone call and the human answering the phone call.

13. The method of claim 12 further comprising:
until determining the automated device answering the phone call or the human answering the phone call, performing steps of i) playing the at least one of the pre-recorded message and the interactive voice response script and ii) ceasing the at least one of the pre-recorded message and the interactive voice response script.

14. The method of claim 4 wherein performing the signal analysis on each of the plurality of portions comprises:
determining a frequency associated with the tone detected in a portion; and
weighting a tone, based on the frequency, to determine if the tone comprises at least one of the tone event and the event for the automated device answering the phone call.

15. The method of claim 14 wherein determining the frequency associated with the tone detected in the portion comprises:
detecting the frequency is within a threshold associated with automated devices; and
determining the automated device is answering the phone call based on the frequency.

16. The method of claim 14 wherein weighting the tone comprises:
establishing a probability associated with the frequency, wherein the probability that the frequency is associated with the automated device answering the phone call diminishes as the frequency is identified as a lower frequency than a higher frequency, and wherein the probability that the frequency is associated with the automated device answering the phone call increases as the frequency is identified as the higher frequency.

17. The method of claim 14 wherein determining the frequency associated with the tone detected in the portion comprises:
identifying a strongest frequency in the portion; and
identifying a tone associated with the strongest frequency in the portion as a dominant tone in the portion.

18. The method of claim 17 wherein identifying the strongest frequency in the portion comprises:
tracking a plurality of tones in the portion;
eliminating any tones that drop out in the portion; and
identifying the strongest frequency from remaining tones in the portion.

19. The method of claim 17 wherein identifying the tone associated with the strongest frequency in the portion as the dominant tone in the portion comprising:
tracking a plurality of frequencies in the portion;
identifying the strongest frequency as being a predetermined percentage stronger than a next strongest frequency; and
identifying the tone associated with the strongest frequency in the portion as an only dominant tone in the portion.

20. The method of claim 2 wherein performing the signal analysis on the most recent portion and data associated with the at least one less recent portion comprises:
detecting a tone in the most recent portion; and
determining that an automated device has answered the phone call.

21. The method of claim 2 wherein performing the signal analysis on the most recent portion and data associated with the at least one less recent portion comprises:

detecting a DTMF in the most recent portion; and
determining that the human has answered the phone call.

22. The method of claim 1 wherein performing, at the processor, signal analysis on the audio stream to compute a sequence of events in the audio stream comprises:
receiving the audio stream real time as the phone call is answered; and
when a duration of the audio stream exceeds a duration of the known audio print by a multiple of a tunable interval, computing a stream audio print on the audio stream and determining whether the stream audio print matches the known audio print.

23. A computer program product for determining whether a phone call is answered by an automated device or a human, the computer program product comprising:
a non-transitory computer readable medium having computer readable program code embodied therewith, the program code executable by a computing processor to:
receive an audio stream from an application;
perform signal analysis on the audio stream to compute a sequence of events in the audio stream, wherein the audio stream is comprised of sound and silence, wherein the sequence of events is computed on the sound and silence, wherein the sequence of events identifies a pattern associated with the audio stream, wherein the pattern is comprised of at least two of sound, silence, frequency, magnitude, duration, tone, and Dual Tone Multi Frequency (DTMF);
determine whether the phone call is answered by the automated device by using a library of known audio prints used by known automated devices and by using a heuristic engine comprising a plurality of rules,
wherein in using the library of known audio prints used by the known automated devices, the determine comprises:
determine that the pattern matches a similar pattern of at least two of sound, silence, frequency, magnitude, duration, tone, and DTMF in a known audio print in the library of known audio prints;
apply a silence constraint to match periods of silence in the sequence of events in the audio stream to periods of silence in the known audio print, wherein the silence constraint is associated with the known audio print; and
based on the matching of the pattern to the similar pattern and on the application of the silence constraint, determine whether there is a first potential match between the sequence of events in the audio stream and the known audio print;
wherein in using the heuristic engine, the determine comprises:
provide the sequence of events as input to the heuristic engine;
apply the plurality of rules in the heuristic engine to the sequence of events; and
based on the application of the plurality of rules, determine whether there is a second potential match between the sequence of events and the plurality of rules in the heuristic engine;
in response to there being either the first potential match or the second potential match, determine that the phone call is answered by the automated device; and
in response to there being neither the first potential match nor the second potential match, determine that the phone call is answered by the human.

24. A system comprising:
a computing processor; and
a non-transitory computer readable medium operationally coupled to the processor, the computer readable medium having computer readable program code embodied therewith to be executed by the computing processor, the computer readable program code configured to:
receive an audio stream from an application;
perform signal analysis on the audio stream to compute a sequence of events in the audio stream, wherein the audio stream is comprised of sound and silence, wherein the sequence of events is computed on the sound and silence, wherein the sequence of events identifies a pattern associated with the audio stream, wherein the pattern is comprised of at least two of sound, silence, frequency, magnitude, duration, tone, and Dual Tone Multi Frequency (DTMF);
determine whether the phone call is answered by the automated device by using a library of known audio prints used by known automated devices and by using a heuristic engine comprising a plurality of rules,
wherein in using the library, of known audio prints used by the known automated devices, the determine comprises:
  determine that the pattern matches a similar pattern of at least two of sound, silence, frequency, magnitude, duration, tone, and DTMF in a known audio print in the library of known audio prints;
  apply a silence constraint to match periods of silence in the sequence of events in the audio stream to periods of silence in the known, audio print, wherein the silence constraint is associated with the known audio print; and
  based on the matching of the pattern to the similar pattern and on the application of the silence constraint, determine whether there is a first potential match between the sequence of events in the audio stream and the known audio print;
wherein in using the heuristic engine, the determine comprises:
  provide the sequence of events as input to the heuristic engine;
  apply the plurality of rules in the heuristic engine to the sequence of events; and
  based on the application of the plurality of rules, determine whether there is a second potential match between the sequence of events and the plurality of rules in the heuristic engine;
in response to there being either the first potential match or the second potential match, determine that the phone call is answered by the automated device; and
in response to there being neither the first potential match nor the second potential match, determine that the phone call is answered by a human.

* * * * *